United States Patent [19]

Kawasaki et al.

[11] Patent Number: 5,151,713
[45] Date of Patent: Sep. 29, 1992

[54] IMAGE RECORDING APPARATUS

[75] Inventors: Keiichi Kawasaki, Tokyo; Keiji Ohkoda, Yokohama; Tomohiro Kudo, Yokohama; Satoshi Shimizu, Yokohama, all of Japan

[73] Assignee: Cannon Kabushiki Kaisha, Tokyo, Japan

[21] Appl. No.: 544,647

[22] Filed: Jun. 27, 1990

[30] Foreign Application Priority Data

| Jun. 30, 1989 | [JP] | Japan | 1-169411 |
| Jun. 30, 1989 | [JP] | Japan | 1-169412 |
| Jun. 30, 1989 | [JP] | Japan | 1-169413 |
| Dec. 15, 1989 | [JP] | Japan | 1-326926 |
| Dec. 15, 1989 | [JP] | Japan | 1-326927 |
| Mar. 26, 1990 | [JP] | Japan | 2-77654 |
| Apr. 25, 1990 | [JP] | Japan | 2-109327 |

[51] Int. Cl.$^5$ ............................................. H04N 1/21
[52] U.S. Cl. ................................... 346/108; 346/134; 355/309
[58] Field of Search ............... 355/317, 311, 243, 308, 355/309; 346/108, 134, 136

[56] References Cited

U.S. PATENT DOCUMENTS

| 4,579,444 | 4/1986 | Pinkney | 355/317 |
| 4,665,408 | 5/1987 | Toriumi et al. | 346/134 |
| 4,754,292 | 6/1988 | Itakura | 346/150 |

Primary Examiner—Mark J. Reinhart
Attorney, Agent, or Firm—Fitzpatrick, Cella, Harper & Scinto

[57] ABSTRACT

In an image recording apparatus, a supply magazine and a receive magazine are arranged almost in a row, and a sheet transport path is formed along the periphery of both magazines. A recording sheet, which is taken out of the supply magazine, is once moved to a path whose transport resistance is small, so that the trailing edge of the recording sheet is completely out of the supply magazine. Then, a subscanning operation for image recording is performed along the path whose transport resistance is small.

24 Claims, 13 Drawing Sheets

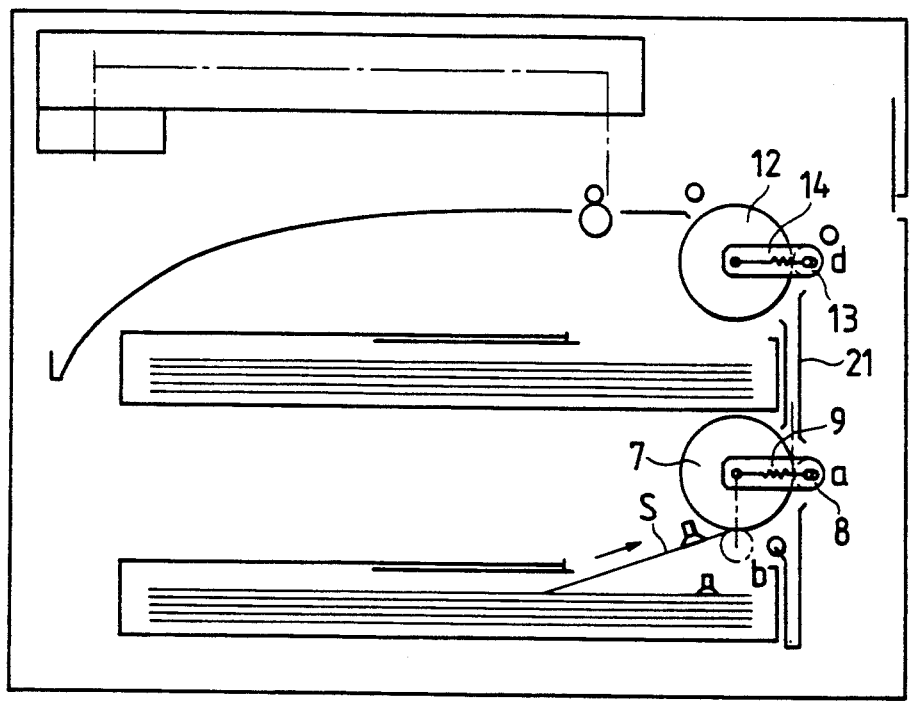
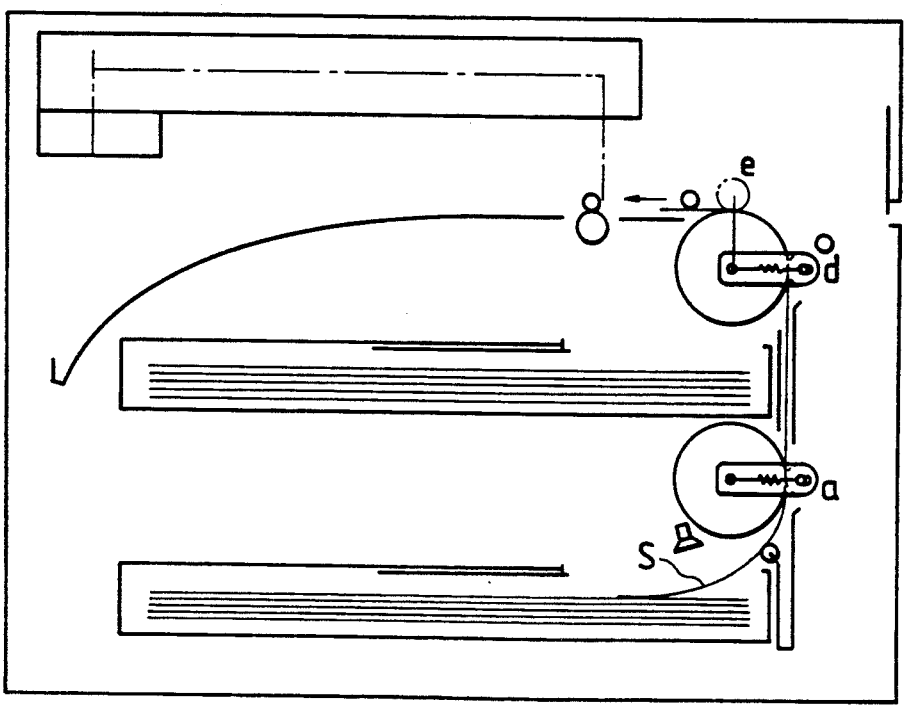

IMAGE RECORDING APPARATUS

BACKGROUND OF THE INVENTION

1. Field of the Invention

The present invention relates to an image recording apparatus which records an image by scanning a recording sheet with a light beam.

2. Related Background Art

FIG. 24 shows a conventional image recording apparatus disclosed in U.S. Pat. No. 4,665,408 which optically records an image on a recording sheet. As shown in the figure, non-used sheets 132 for recording are piled in a supply magazine 131. A suction device 134 connected to an air cylinder 133 is mounted above the leading edges of the sheets 132. The air cylinder 133 and the suction device 134 are vertically and pivotally movable on a shaft 135. When the air cylinder 133 and the suction device 134 move downward, the sheets 132 are upwardly by an air suction operation of the air cylinder 133 and the leading edge of the uppermost sheet among the piled sheets 132 is lifted up. A pair of feeding rollers 136, which are horizontally movable, begin to be rotatably driven in response to a start signal, then simultaneously move to the right in the figure, nip the leading edge of the lifted sheet, transport the sheet 132 onto a holding plate 137 by the rotation of the feeding rollers 136, and then the rotation operation is stopped.

A push lever 138 and a sheet correcting portion 140 are respectively pivotally movable on shafts 139 and 141 and retractable out of a sheet transport path. While the pair of feeding rollers 136 are transporting the sheet 132 from the supply magazine 131 to the holding plate 137, the push lever 138 is being retracted upward out of the transport path and the sheet correcting portion 140 enters the transport path.

When the sheet 132 is sent onto the holding plate 137 by the pair of feeding rollers 136, the push lever 138 rotates clockwise and pushes the end edge of the sheet 132 forward. At this time, the leading edge of the sheet 132 abuts against the sheet correcting portion 140 and the center portion of the sheet 132 is curved by the urging force of the push lever 138.

Subsequently, the push lever 138 rotates counterclockwise and releases the end edge of the sheet 132 from being urged. As a result, the sheet 132 is laid flat on the holding plate 137 and the position of the leading edge of the sheet 132 is precisely corrected so it will not be slanted by means of the sheet correcting portion 140.

Next, while the sheet correcting portion 140 rotates counterclockwise and retracts out of the transport path, the push lever 138 rotates clockwise and pushes the end edge of the sheet 132. As a result, the sheet 132 slides onto the holding plate 137 and the leading edge of the sheet 132 comes into a nip between a rotating subscanning drum 142 and nip rollers 143. The subscanning drum 142 is continuously driven to rotate counterclockwise during the recording operation and the nip rollers 143 are also rotated by the usual contact with the drum 142. The sheet 132 is transported to the left in the figure by the rotational force of the subscanning drum 142 the moment it is nipped between the drum 142 and the front nip roller 143.

An optical system unit 144 is mounted above the holding plate 137. A laser beam emitted from a laser source 145 is directed between the two nip rollers 143 through a mirror 146 and mainly scans the photoconductive recording sheet 132 which is being transported on the subscanning drum 142 so as to form a predetermined image.

The sheet 132, on which the image is thus formed, is fed from between the subscanning drum 142 and the rear nip roller 143 to the left in the figure, gradually hangs down from the leading edge thereof due to its own weight, and is stored in a receive magazine 147.

Next, referring to FIG. 25, another example of the prior art will be described. FIG. 25, like FIG. 24, shows a conventional image recording apparatus which optically records an image on a recording sheet and is disclosed in U.S. Pat. No. 4,754,292. Non-used recording sheets are denoted by 202a and piled and stocked in a supply magazine 202 which is almost horizontally mounted. A suction device 203 supported by a mechanism, not shown, is positioned near the right edge of the sheet 202a in the figure. The suction device 203, which can be retracted out of the supply magazine 202 by the support mechanism, comes into the supply magazine 202, sucks the uppermost sheet among the piled sheets, and then moves to the upper right in the figure and puts the sucked sheet into a pair of feeding rollers 204. The pair of feeding rollers 204 are rotatably driven by a driving mechanism, not shown, and transport the sheet 202a into a transport path constituted by guide plates 205 and 206. A pair of feeding rollers similar to 204 are denoted by 224 and further transport the sheet 202a, which is fed between the guide plates 205 and 206 to a transport path constituted by guide plates 207 and 208. When the end edge of the sheet 202a separates from the pair of feeding rollers 224, the sheet 202a falls due to its own weight, is guided by the guide plates 207 and 208, and then reaches a pair of feeding rollers 209. After that, the pair of rollers 209 rotate in a direction which ejects the sheet upward, correct the position of the sheet, and then reversely rotate so as to lead the sheet to a transport path constituted by guide plates 211 and 210 and make the leading edge of the sheet reach pairs of subscanning rollers 212 and 213. Reference numeral 221 denotes an optical system unit which is almost horizontally mounted below the supply magazine 202. A laser beam 221a emitted from a laser source, not shown, in the optical system unit 221 is irradiated onto the sheet nipped between the pairs of subscanning rollers 212 and 213 and forms a predetermined image on the sheet by scanning in a direction almost perpendicular to the transport direction of the sheet. After the recording is completed, the sheet is transported through a transport path constituted by guide plates 214, 216, 217, 219 and 220 by pairs of feeding rollers 215 and 218 and led to an automatic developing device 222.

However, the prior art shown in the above FIGS. 24 and 25 have the defects described below.

First, in the apparatus shown in FIG. 24, there is a problem that the apparatus is large owing to the construction thereof. The overall length of the holding plate 137 is a little longer than that of the sheet 132. Therefore, if the overall length of the sheet is $L_f$, the distance $L_o$ between the recording device and the end edge of the piled non-used sheets is theoretically longer than $2L_f$ and normally almost equals $3L_f$. In the case that a half-size (43 cm×35 cm) sheet is used and L equals 43 cm, the width of the apparatus must be approximately 130 cm and thus the apparatus is quite large.

In order to further shorten $L_o$ in the same prior art construction, it is necessary to shorten the overall length of the holding plate 137. In this case, it is quite likely that the trailing edge of the sheet 132 will remain in the supply magazine 131 when the recording is started, and will be in contact with the upper plane of the piled non-recorded sheets. As a result, it seems that the resistance force, which acts in the reverse direction to the above-mentioned transport direction of the sheet, becomes much higher than that of the prior art and furthermore changes rapidly. This is because the friction coefficient of the surface of the non-used recording sheet is higher than that of the holding plate 137 whose surface is smoothly treated. As a result, the surface of the non-used recording sheet is more disadvantageous than the surface of the holding plate 137 as the former surface is subject to static electricity and stickiness. Therefore, the transport speed of the sheet, that is, the subscanning speed becomes uneven and this causes deterioration of the image. Accordingly, in the apparatus of the prior art, it is difficult for $L_o$ to be shorter than $2L_f$.

On the other hand, in the prior art shown in FIG. 25, since the transport path is located in the lower portion of the apparatus in relation to the overall construction, a jamming recovery operation, or maintenance operations for a drive source, a drive mechanism, guide plates and so on must be performed from the side of the apparatus and such operations are difficult to carry out.

In addition, in the apparatus shown in FIG. 25, the sheet, which is being recorded, does not naturally hang down due to its own weight, but is against the own weight and the elasticity of the sheet. In other words, both the weight of the sheet and the elastic force of the curved sheet are added to the transport path. Therefore, the resistance force against transport in the subscanning direction and the change in resistance are large and a high-precision subscanning is difficult.

SUMMARY OF THE INVENTION

An object of the present invention is to realize a compact apparatus without lowering transport stability.

Another object of the present invention is to provide a simple mechanism which can reliably execute registration of sheets in the above apparatus.

BRIEF DESCRIPTION OF THE DRAWINGS

FIGS. 3 to 8 are views explaining operations;

DETAILED DESCRIPTION OF PREFERRED EMBODIMENTS

Several embodiments, to which the present invention is applied, of an image recording apparatus for recording an image on a recording sheet by means of irradiation energy, such a light beam or the like, will be now described in detail. A sheet-shaped photoconductive recording medium suitable for light wavelength of a light beam, for example, a silver-halide film, a storage-type fluorescent sheet and so on, is used as a recording sheet.

First Embodiment

Figure 1:
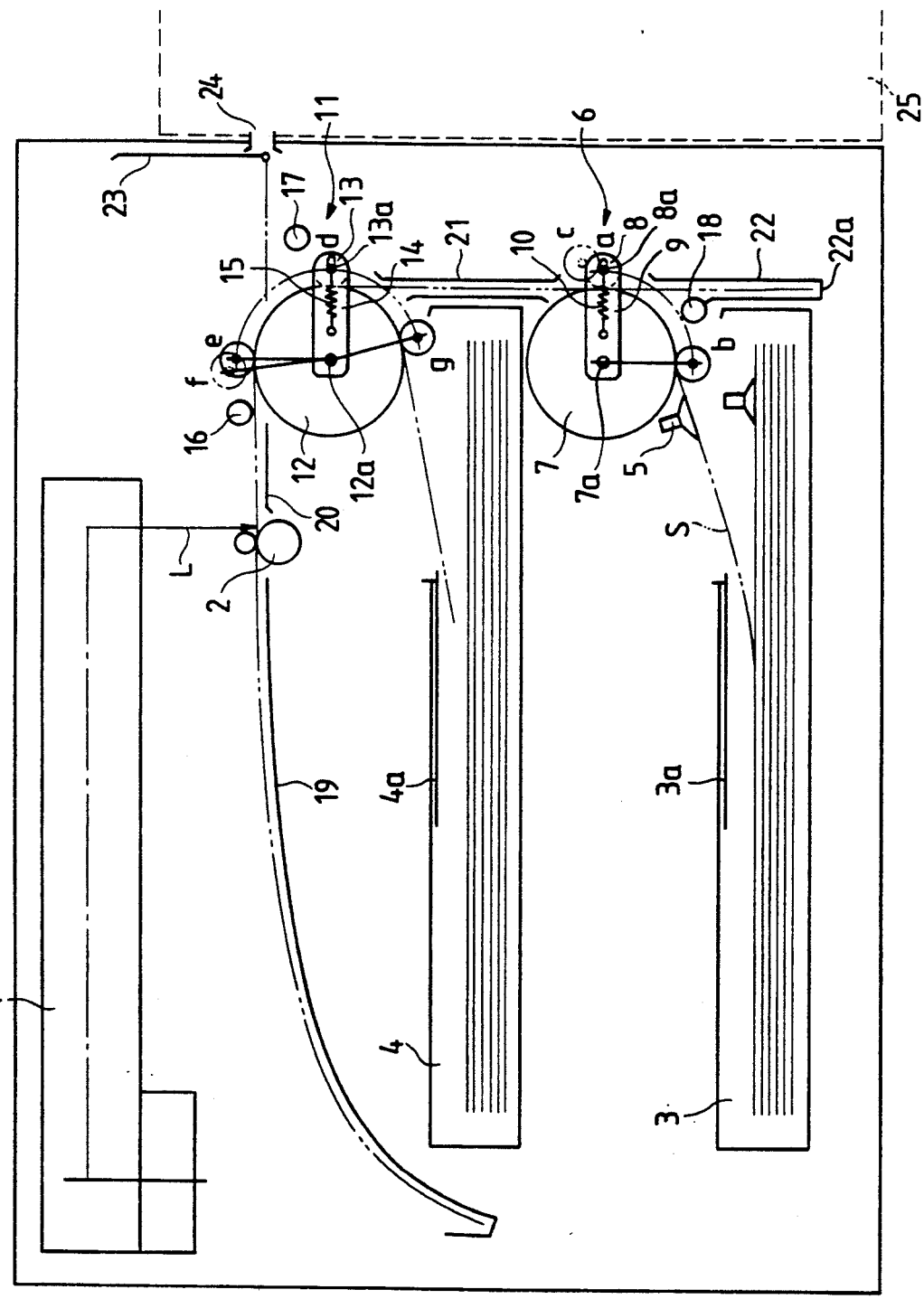
FIG. 1 is a view showing a structure of a first embodiment of the present invention.

FIG. 1 is a view showing a structure of a first embodiment of the present invention. As shown in FIG. 1, reference numeral 1 denotes a laser optical unit which comprises a laser source, such as a semiconductor laser, a gas laser or the like, a light modulation means, such as a modulation control circuit, a light modulation device or the like, a scanning optical member, such as a polygonal mirror or the like, a mirror and so on, and optically scans a film at a recording position by deflecting a laser beam L, which is modulated in accordance with an image signal, into the direction of main scanning by means of rotation of the polygonal mirror. While the sheet is being transported, the laser beam is prevented from irradiating to the recording position by a shutter, not shown, or the like. Located below the laser optical unit 1 are subscanning rollers 2. The subscanning rollers 2 are a pair of rollers, in which one roller has a rotational driving force and the other roller follows said first roller, whereby the rollers transport the sheet nipped therebetween at a constant speed and perform subscanning for image recording. The laser beam L from the laser optical unit 1 is optically scanned to the vicinity of the subscanning rollers 2. Below the subscanning rollers 2 a supply magazine 3, in which non-recorded sheets are piled, and a receive magazine 4, in which recorded sheets are stocked, are arranged in a row in this order from below. The magazines 3 and 4 are respectively provided with slide covers 3a and 4a, which can be opened and shut for ejecting and receiving sheets, on the upper planes of the magazines. The inside of the magazines is shaded from the outside by shutting the slide covers 3a and 4a. Emulsion surfaces of the film sheets piled in both magazines 3 and 4 face downward, so that the shading efficiency is further enhanced.

Reference numeral 5 denotes a suction device which is mounted to take out the sheets, which are stocked in the supply magazine 3, one by one through an opening of the magazine 3. Reference numeral 6 denotes a direction turning unit which controls the feeding direction of the sheet to be fed.

Figure 2:
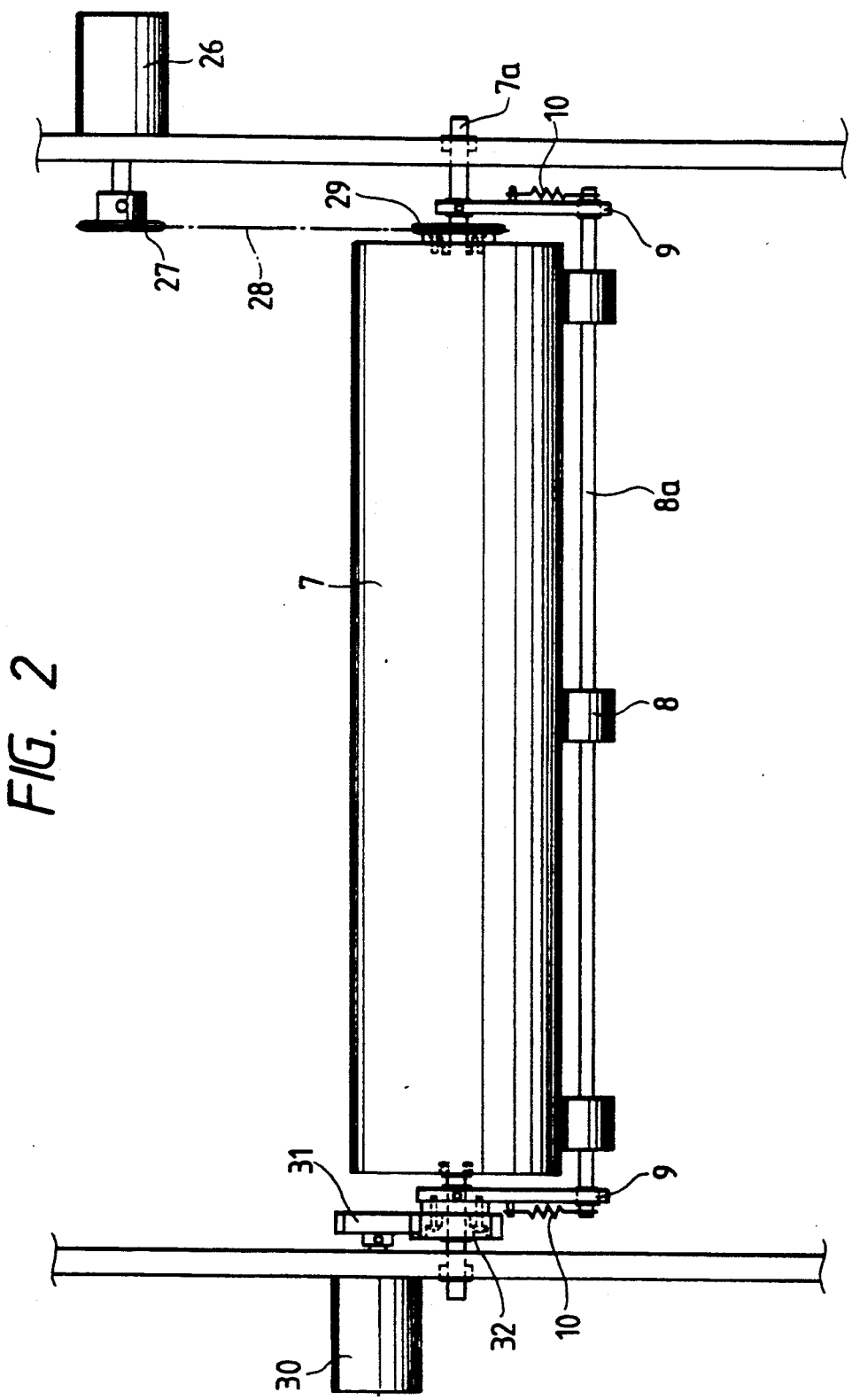
FIG. 2 is a detailed view of a turning unit.

FIG. 2 is a detailed top view of the direction turning unit 6. A driving roller 7 is movable in both directions by the driving force of a motor 26, which is transmitted by a chain 28 and sprockets 27 and 29. A shaft 7a is driven by a motor 30 and gears 31 and 32 and controls the operation of a lever 9 fixed to the shaft 7a independent of the rotation of the driving roller 7. A driven roller 8 is rotatably supported by a shaft 8a and the shaft 8a is urged by a spring 10 along an elongated hole mounted on the lever 9. If the surface of the driven roller 8 is smoothly treated and the coefficient of friction thereof is small, the driven roller 8 is not required to be rotatable. The driven roller 8 planetarily revolves around the driving roller 7 in correlation to the rotation of the lever 9 and is pressed against the driving roller 7 by the spring 10; However, when the driven roller 8 moves from the position "a" to "c" (shown in FIG. 1) in response to the turn of the lever 9, the shaft 8a of the driven roller 8 is guided by a guide pin, not shown, and the driven roller 8 is separated from the periphery of the driving roller 7. Furthermore, an encoder, not shown, is connected to the shaft 7a and the angle of planetary revolution of the driven roller 8 can be detected from outputs of the encoder.

Figure 12:
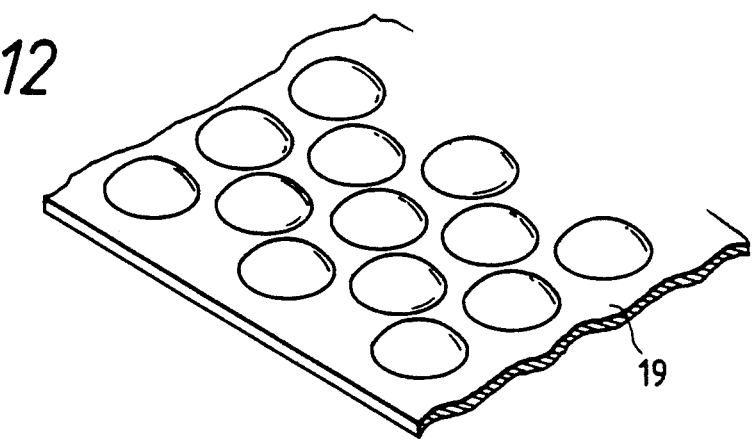
FIGS. 12 and 13 are views showing the state of the surface of a guide plate.
Figure 13:
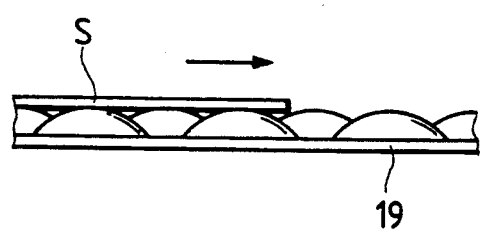

Returning to FIG. 1 reference numeral 11 denotes a direction turning unit which has the same composition as the direction turning unit 6 and a driving roller 12 is driven together with the driving roller 7 through a chain 28 by the single motor 26. Reference numerals 16, 17 and 18 denote fixed rollers which are rotatably supported and guide a film so that the surface of the film does not rub against guide plates while being transported. Guide plates are denoted by 19 to 22 and form transport paths which are mainly straight or slightly curved. The guide plate 19 is curved in the direction of gravity. A material of the guide plate to be used is not subject to cause static electricity due to the friction with the film, and the surface of the guide plate is smoothly treated and the coefficient of friction thereof is small so that the emulsion surface of the film is not damaged by rubbing against the guide plate while the film is being transported. In addition, if the surface of the guide plate is, as shown in FIGS. 12 and 13, embossed, that is, has many elliptic smooth projections which are regularly arranged, the area in contact with the sheet S is small, so that this has a further excellent effect on reducing the coefficient of friction and static electricity.

Mounted at the bottom of the guide plate 22 is a sheet correcting portion 22a for correcting and positioning a slanted sheet, that is, for registration.

Furthermore, an automatic developing device 25 can be connected to the side of the apparatus and a recorded sheet can be transported through a slit opening 24 into the automatic developing device 25.

As shown in FIG. 2, a control circuit 120 is mounted to control driving of all driving members, including the motors 26 and 30 and the subscanning rollers 2, and performs the control based on setting of a setting circuit 121.

The length of the transport path between the sheet correcting portion 22a and the subscanning rollers 2 is set a little longer than the length of the sheet in the transport direction, and the length of the transport path between the subscanning rollers 2 and the end of the guide plate 19 is set a little shorter than the length of the sheet in the transport direction. When the leading edge of the sheet taken out of the supply magazine 3 reaches the subscanning rollers 2, the end edge of the sheet still remains in contact with the piled sheets in the supply magazine 3. Hereinafter, a path, through which the sheet taken out of the supply magazine 3 is fed to the guide plate 19, is called a first transport path, and a path, through which the sheet is fed from the bottom end of the guide plate 22 to the guide plate 19, is called a second transport path. The first and second transport paths have a common path from an initial position indicated by "a" in FIG. 1 to the guide plate 19. The second transport path is mounted almost along the periphery of the supply magazine 3 and the receive magazine 4 so as to almost surround both magazines. This can make the whole apparatus compact.

Next, operations of the image recording apparatus will be described with reference to FIGS. 3 to 8.

The supply magazine 3 in which non-recorded sheets are piled is loaded at a predetermined position in the main body of the apparatus and the slide cover is opened on condition that the inside of the apparatus is shaded.

Then, the suction device 5 is operated to lift the uppermost sheet of the sheets piled in the supply magazine 3 as shown in FIG. 3. Subsequently, when the lever 9 is turned in an almost 90-degree arc clockwise to rotate the driven roller 8 from the initial position "a" to the position "b", the edge of the sheet lifted by the suction device 5 is nipped between the driving roller 7 and the driven roller 8. After the leading edge of the uppermost sheet is thus lifted, the driving roller 7 is rotated counterclockwise, the lever 9 is simultaneously turned at the same angular velocity, and then the driving roller 7 and the driven roller 8 are rotated with nipping the leading edge of the sheet to change the advance direction of the sheet in the upward direction. When the driven roller 8 is returned to the initial position "a", the turning of the lever 9 is stopped and only the driving roller 7 is kept rotating. As a result, the advance direction is fixed to a vertical direction and the sheet is vertically transported upward through the transport path guided by the guide plate 21.

The leading edge of the sheet reaches the direction turning unit 11 and is nipped between the driving roller 12, which is rotating counterclockwise at the same speed as the driving roller 7, and the driven roller 13, which stands by in the position "d", and then, a lever 14 is also turned at the same angular velocity as the driving roller 12 and changes the advance direction of the sheet. When the driven roller 13 reaches the position "e", (shown in FIG. 4), the lever 14 is stopped and the advance direction of the leading edge of the sheet is fixed to the left. The sheet advances, as shown in FIG. 4, to the left on the transport path in correlation to the continuous rotation of the driving roller 12.

Figure 5:
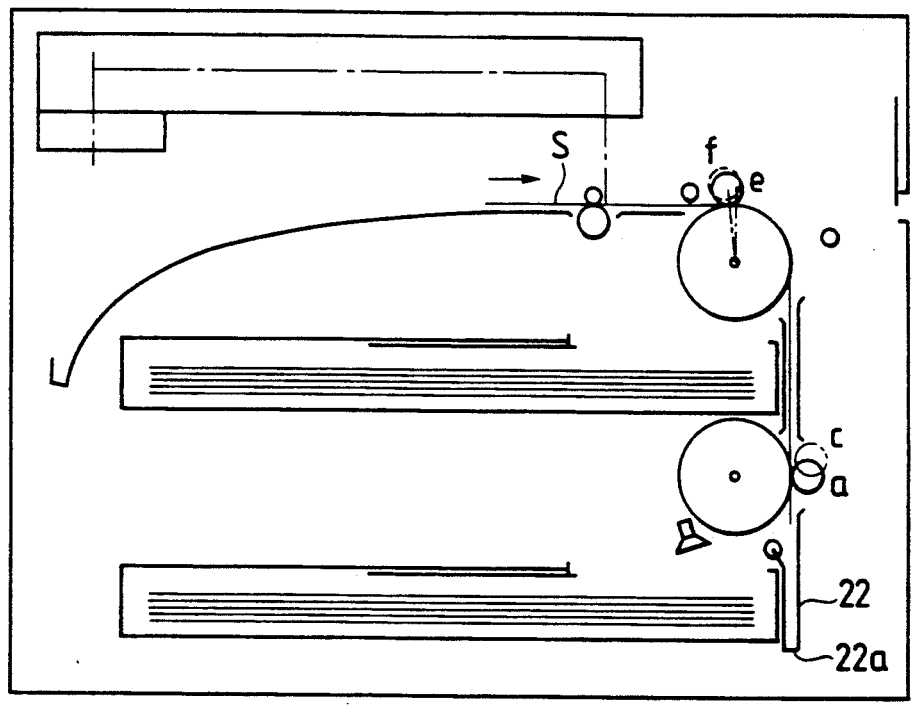

When the leading edge of the sheet transported along the first transport path passes between the pair of rotating subscanning rollers 2, the end edge of the sheet is completely taken out of the supply magazine 3 and reaches the position where the end edge vertically stands along the transport path, as shown in FIG. 5, the subscanning rollers 2 and the driving rollers 7 and 12 of the direction turning units stop the rotation thereof. Subsequently, the driven rollers 8 and 13 respectively retract to the positions "c" and "f" indicated by dotted lines and release the sheet from being nipped. In other words, only the driving force of the subscanning rollers 2 is transmitted to the sheet.

Then, the subscanning rollers 2 start a reverse rotation and the sheet advances along the second transport path in the reverse direction. At this time, the end edge of the sheet vertically falls and enters the second transport path guided by the guide plate 22. When the leading edge of the sheet is separated from the subscanning rollers 2 which are reversely rotating, the sheet falls due to its own weight, the end edge of the sheet comes down against the sheet correcting portion 22a at the bottom of the guide plate 22 and is properly arranged. Even if the sheet taken out of the supply magazine 3 is slanted against the transport direction by any cause in the transport process to this point, the slant can be corrected and the position of the sheet is properly arranged.

After the registration is thus performed, the driving roller 12 is rotated counterclockwise, the driven roller 13 is returned to the position "e", and the positioned sheet is transported toward the recording position along the second transport path. When the leading edge of the sheet reaches the subscanning rollers 2 which are rotating for subscanning in the normal direction and is nipped between the pair of subscanning rollers 2, the driven roller 13 is simultaneously retracted to the position "f" and the driving roller 12 is stopped.

Figure 6:
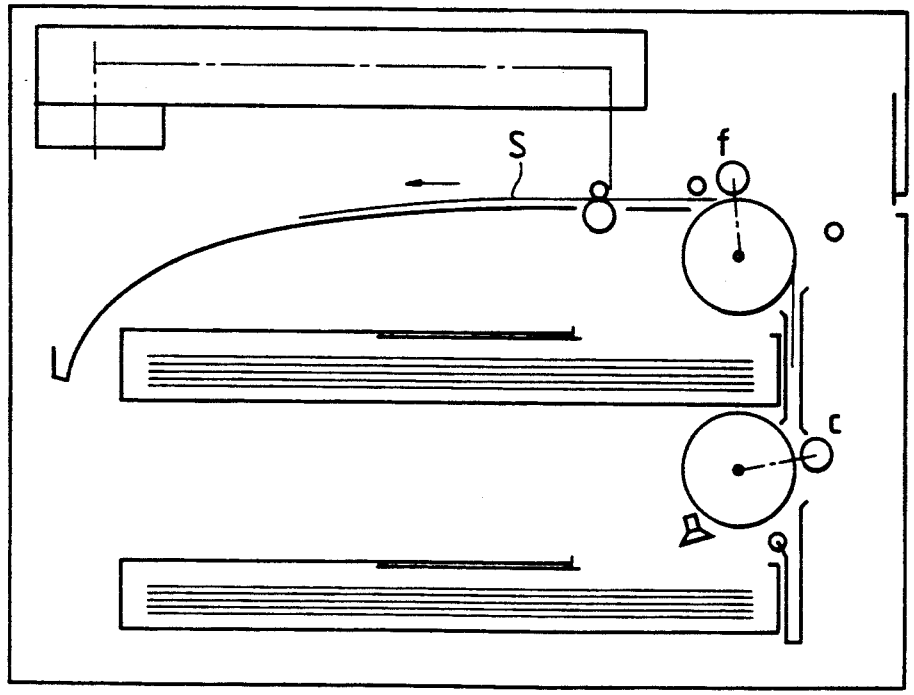
Figure 7:
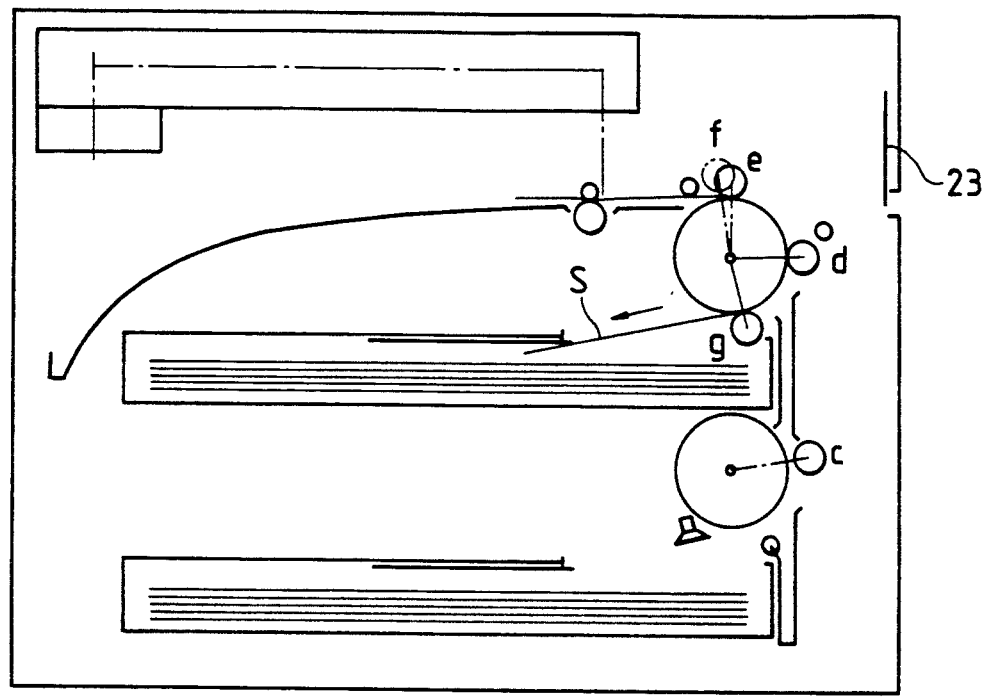
Figure 8:
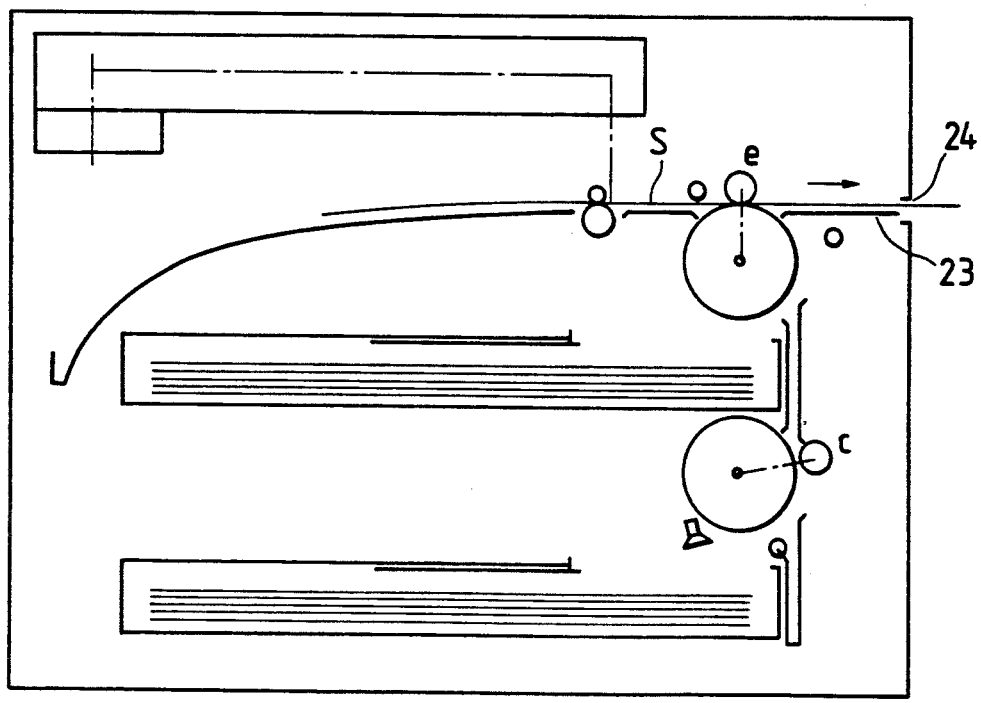

When the subscanning operation of the sheet is started by the subscanning rollers 2, the shutter or the like in the laser optical system 1 is opened, the main scanning operation by the laser beam is started, and a latent image is recorded on the upper emulsion surface of the sheet as shown in FIG. 6.

Though the sheet, which is subscanned along the second transport path, is curved along the periphery of the driving roller 12, the curve at this portion is near a natural curve because the restitution of the flexible sheet against curve and the hanging force of the sheet due to its own weight offset each other. Therefore, the force added to the driven roller 13 and the guide plate 21 by the sheet is small.

Since the guide plate 19 is curved in the direction of gravity, the transport resistance between the sheet, which is transported onto the guide plate 19 after being recorded, and the guide plate 19 is extremely small. The transport at this portion will be described in more detail with reference to FIGS. 9 to 11.

Figure 9:
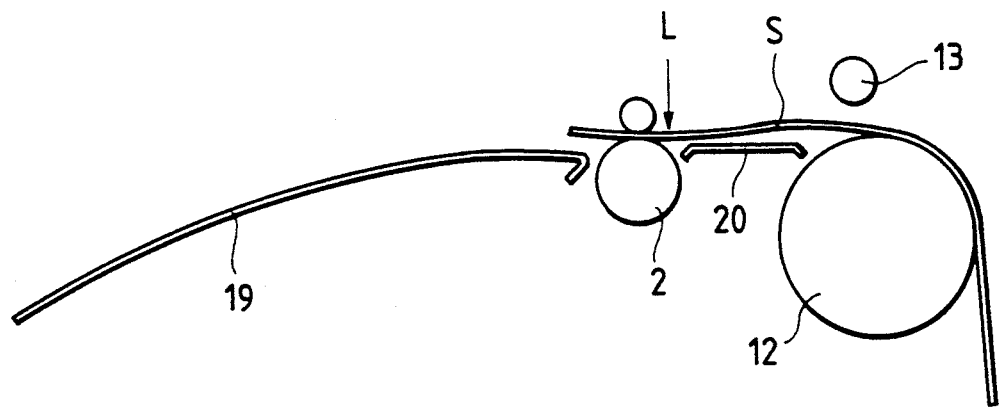
FIGS. 9 to 11 are views showing movements of a sheet which is being recorded.

FIG. 9 shows the state immediately after the recording operation has been started. At this time, since the guide plate 19 is located below the leading edge of the sheet S, the leading edge of the sheet S is hanging in the air.

Figure 10:
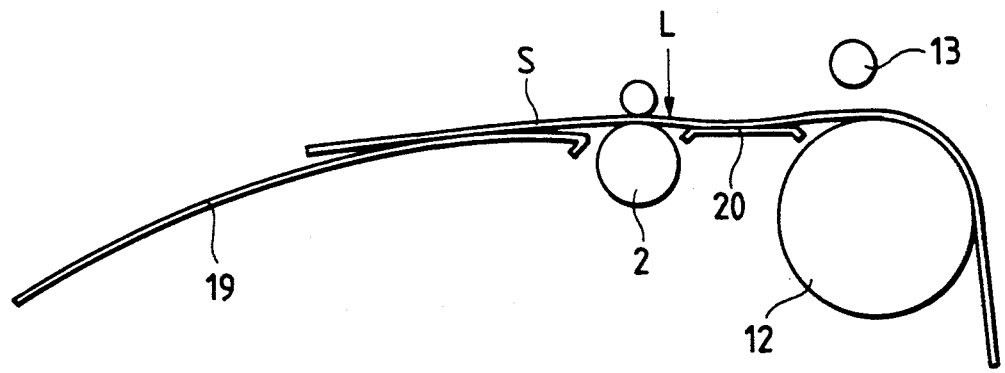

FIG. 10 shows the state in which the leading edge of the sheet S is hanging down due to its own weight and a masked portion of the sheet S and the guide plate 19 are in contact. At this time, since the curvature of the portion near the leading edge of the sheet S is set larger than that of the guide plate 19, the sheet is not in contact with the guide plate 19 at some length from the leading edge thereof. As a result, the sheet S and the guide plate 19 come into contact with each other with preventing the leading edge of the sheet S from bumping against the guide plate 19 and the degree of shock caused by the contact can be minimized.

Figure 11:
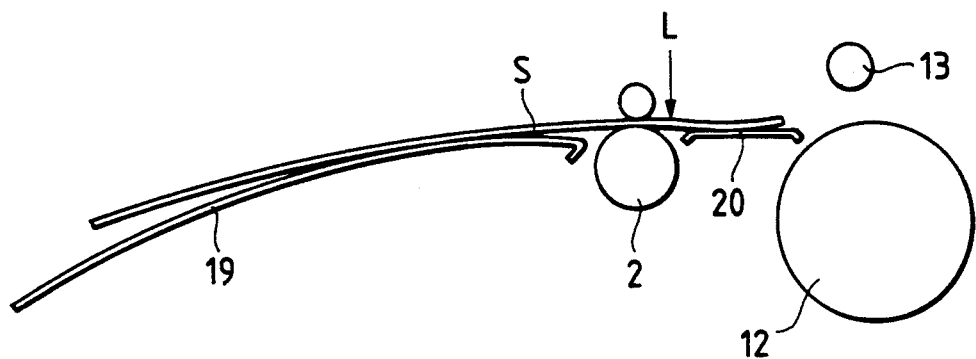

FIG. 11 shows the state immediately before the recording operation is completed. As shown in FIG. 11, some portion at some length from the leading edge of the sheet S is not in contact with the guide plate 19 from the state shown in FIG. 10 till the end of the recording operation. Therefore, even if the guide plate 19 has a scratch and so on on the surface thereof, the leading edge of the sheet S is not caught by the scratch and so on and a stable subscanning precision can be obtained. Furthermore, since air flows easily between the sheet S and the guide plate 19, it is unlikely that the sheet S and the guide plate 19 are in close contact with each other.

By making the surface of the guide plate 19 embossed, on which many elliptic smooth projections are regularly arranged, as mentioned above, the area of the guide plate 19 in contact with the sheet S is reduced and this is advantageous for further reducing the coefficient of friction and static electricity.

As described above, the sheet maintains a natural state thereof without being curved by force at many portions of the second transport path, and there is little transport resistance, such as friction, static electricity and so on, between the sheet and the guide plate.

Compared with the first transport path through which the sheet taken out of the supply magazine 3 is transported, the second transport path does not cause a large resistance, which arises due to a tight contact by static electricity and so on between the end edge of the sheet to be transported and the sheets piled in the supply magazine 3 in the first transport path, and furthermore, the friction resistance between the guide plate and the roller which is caused by restitutive elasticity of the sheet and a change in the resistance is little. Therefore, the second transport path has much less transport resistance than the first transport path. As a result, the subscanning operation can be performed at a changeless and stable transport speed and a high-quality even image can be recorded.

After the image recording operation is thus completed, the recorded sheet is transported in the direction reverse of the direction for the recording operation by reversely rotating the subscanning rollers 2. When the end edge of the sheet reaches the driving roller 12, the driven roller 13, which has been retracted, is returned to the position "e" so as to grip the end edge of the sheet, and rotated at the same angular velocity as that of the driving roller 12, so that the advance direction of the sheet is changed. When the driven roller 13 reaches the position "g" shown in FIG. 7, the recorded sheet is transported into the receive magazine 4 by stopping the drive of the lever 14 so as to stop the driven roller 13 and keeping on driving the driving roller 12. The driving roller 12 transports the recorded sheet into the receive magazine 4, and then, the driven roller 13 is returned to the initial position "d".

The number of the sheets already stocked in the receive magazine 4 is detected by a means which is not shown. The height of the piled sheets in the receive magazine 4 is estimated based on the detected number and the stop position "g" of the driven roller 13 is determined according to the height. Therefore, it is possible to always transport the recorded sheet into the receive magazine 4 without incorrect operations regardless of the number of piled sheets.

The angle at which the sheet intrudes into the receive magazine 4 may be controlled to gradually increase by gradually changing of the position of the driven roller 13 from the position "g" to the position "d" while the sheet is being transported into the receive magazine.

Furthermore, by changing the advance direction of the recorded sheet by using the direction turning unit 11, it is possible to directly transport the recorded sheet to an automatic developer and so on mounted outside of image recording apparatus, instead of stocking the recorded sheet in the receive magazine 4. In this case, when the recording operation of the sheet is completed, a movable guide plate 23 is horizontally tilted down and moved to the position shown in FIG. 8. The driven roller 13 is fixed at the position "e" so as to advance the sheet straight to the right. The recorded sheet can be ejected through the opening 24 and transported into the automatic developer directly connected to the side of the apparatus by keeping on rotating the driving roller 12 clockwise.

Second Embodiment

Figure 14:
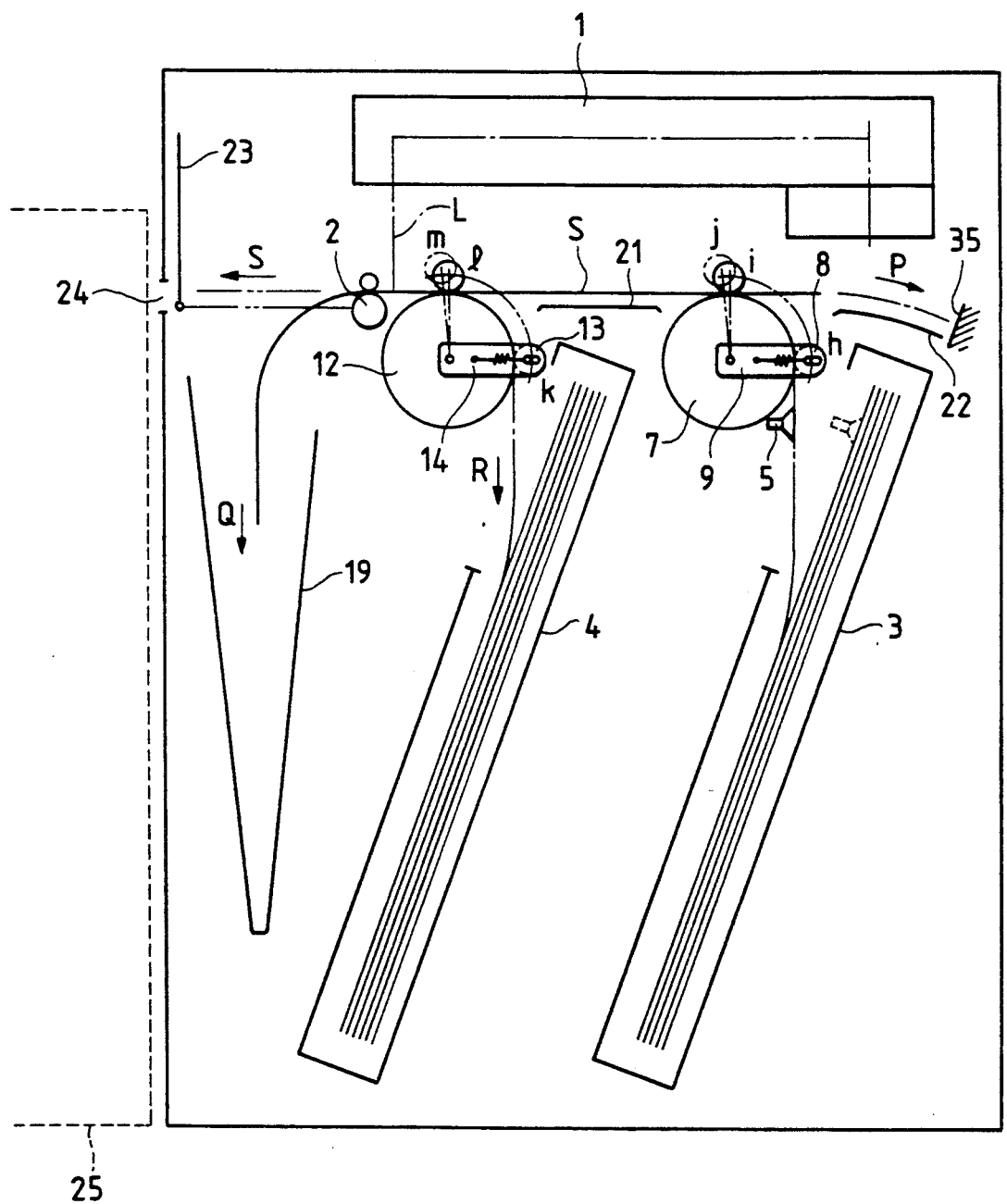
FIG. 14 is a view showing a structure of a second embodiment of the present invention.

Next, the second embodiment of the present invention will be described. FIG. 14 shows the structure of the embodiment. The same numerals as those shown in FIG. 1 denote the same or equivalent members as or to those shown in FIG. 1.

The same direction turning units as in the above embodiment are respectively mounted near the openings of the supply magazine 3 and the receive magazine 4 which are slantingly mounted in a row in the main body of the recording apparatus. The laser optical unit 1 is mounted above the units. A transport path from the supply magazine 3 to the guide plate 19 through the guide plate 21 and the subscanning rollers 2 along the periphery of the driving roller 7 constitutes a first transport path, and a transport path from a sheet correcting portion 35 to the guide plate 19 through the guide plates 22 and 21 and the subscanning rollers 2 constitutes a second transport path. The second transport path is arranged so as to almost surround the supply magazine 3 and the receive magazine 4, which are arranged in a row, almost along the periphery of both magazines. This arrangement makes the whole apparatus compact.

Next, operations of the embodiment will be described. A sheet S is taken out of the supply magazine 3 by the suction device 5 and the leading edge of the taken sheet abuts against the periphery of the driving roller 7. Then, the driven roller 8, which has stood by at the initial position "i", is revolved clockwise to the position "h" and the leading edge of the sheet is nipped between the driving roller 7 and the driven roller 8. When the driving roller 7 is rotated counterclockwise and simultaneously the lever 9 is turned at the same angular velocity as that of the driving roller 7, the driving roller 7 and the driven roller 8 change the advance direction of the leading edge of the sheet into the left in the figure, with nipping the same position of the leading edge of the sheet. When the driven roller 8 is returned to the position "i", the sheet is transported to the left along the guide plate 21 by stopping the drive of the lever 9 and keeping on the rotational drive of the driving roller 7. The leading edge of the sheet reaches and is nipped between the driving roller 12, which is driven in synchronization with the driving roller 7, and the driven roller 13, so that the rotation of the two rollers transports the sheet S to the left. Subsequently, the leading edge of the sheet is also gripped by the subscanning rollers 2, which is rotatably driven at the same speed as the driving roller 12 so as to transport the sheet. At this time, the sheet is still laid on the first transport path, and the trailing edge of the sheet remains in the supply magazine 3 and is in contact with the piled sheets. However, the trailing edge of the sheet leaves the supply magazine 3 before long, sprung up due to its elasticity, and becomes horizontal state as shown in the figure.

In this state, the driving rollers 7 and 12 and the subscanning rollers 2 are reversely rotated, so that the sheet S is moved in the direction P, that is, to the second transport path. When the end edge of the sheet S abuts against the sheet correcting portion 35, the rotation is stopped and the registration is completed. After that, the driving- rollers 7 and 12 are rotated counterclockwise again so as to transport the sheet in the subscanning direction. When the leading edge of the sheet S reaches the subscanning rollers 2, which are rotating for subscanning, and is nipped, the driven rollers 8 and 13 are respectively retracted to the positions "j" and "m", so that the sheet is freed.

The image recording onto the sheet is thus performed by subscanning the sheet along the second transport path, whose transport resistance is extremely small, and starting the main scanning operation by the laser beam from the optical unit 1. The recorded area of the sheet is transported to the left in the figure, gradually hangs down due to its own weight in the direction Q, and enters the guide plate 19 which has little friction resistance.

When the recording operation is completed, the subscanning rollers 2 are reversely rotated and the sheet is returned into the direction turning unit. The leading edge of the sheet reaches the driving roller 12 and then, the driven roller 13 is returned from the position "m" to the position "l" and grips the leading edge. By rotating the driving roller 12 clockwise and simultaneously turning the lever 14 clockwise at the same angular velocity, the driven roller 13 is revolved from the position "l" to the position "k" and changes the advance direction of the sheet into the direction R while gripping the leading edge of the sheet. When the driven roller 13 reaches the position "k", only the turn of the lever 14 is stopped and the driving roller 12 is continued to rotate, so that the sheet is transported into the receive magazine 4.

In the present embodiment, it is possible to eject the recorded sheet into the automatic developer 25 and so on mounted outside of the recording apparatus, instead of transporting the sheet into the receive magazine 4. In this case, the driving roller 12 is rotated with the driven roller 13 fixed at the position 1, and the recorded sheet is once again returned onto the horizontal transport path which is composed of the guide plates 21 and 22. After the leading edge of the sheet comes out of the guide plate 19 and almost reaches the subscanning rollers 2, the movable guide plate 23 is tilted down. Then, the sheet is transported in the direction S and ejected through the opening 24 mounted on the apparatus.

In another method of ejecting the sheet into the automatic developer and so on, the movable guide plate 23 may be horizontally tilted down at the beginning of the recording operation so as to directly eject the sheet, which is transported in the subscanning direction, in the direction S through the opening 24. This method can shorten the cycle time.

Third Embodiment

Figure 15:
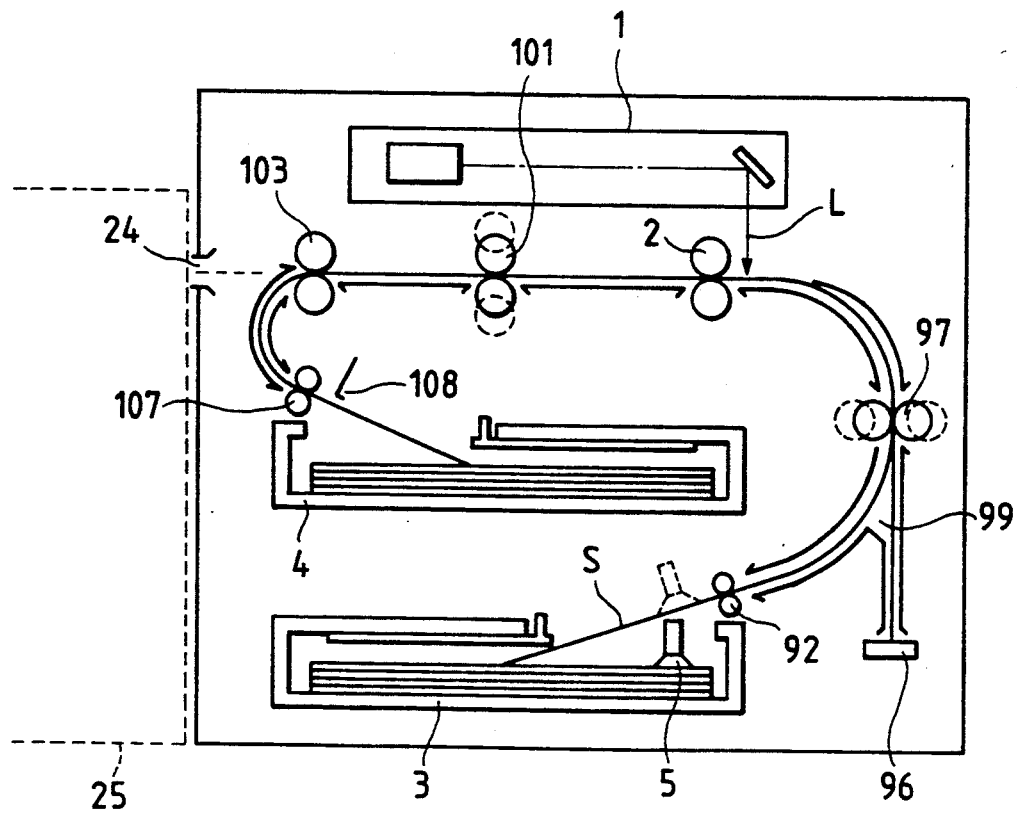
FIG. 15 is a view showing a structure of a third embodiment of the present invention.

Next, the third embodiment of the present invention will be described with reference to FIG. 15.

The leading edge of the sheet S separated by the suction device 5 is nipped between feeding rollers 92. The feeding rollers 92 transport the sheet S, which is brought by the suction device 5, to the upper right in the figure along the transport path composed of guide plates. A one-way clutch is mounted between the pair of feeding rollers 92 and a drive source for driving the feeding rollers 92, and therefore, even if the drive source is stopped, it is possible to easily put the sheet to the upper right in the figure into between the pair of feeding rollers 92. The sheet reaches feeding rollers 97, and then is transported to the upper left in the figure along the transport path by the drive force of the feeding rollers 97.

When the end edge of the sheet reaches an intersection 99 of the transport paths, it is vertically turned by its elasticity. Then, the drive of the feeding rollers 92 and 97 and the subscanning rollers 2 is temporarily stopped. After that, the subscanning rollers 2 and the feeding rollers 97 are reversely rotated to reversely transport the sheet. Since the end edge of the sheet is put in the vertical state due to the elasticity of the sheet at this time, the sheet to be reversely transported enters the vertical transport path toward a correcting member 96.

When the leading edge (the trailing edge in the reverse advance direction) of the sheet is moved to the right in the figure, and released from the subscanning rollers 2, the feeding rollers 97 are retracted out of the transport path so as to set the sheet free. Then, the sheet falls due to its own weight in the transport path, the trailing edge (the leading edge in the advance direction during falling) of the sheet strikes the sheet correcting member 96 and stops. The sheet correcting member 96 is precisely positioned and fixed so that the leading and trailing edges of the sheet are parallel to the direction of the main scanning of a recording beam L described below. Therefore, the sheet which falls due to its own weight is registered by the sheet correcting member 96. Even if the sheet is slanted by some cause in the transport process up to this, the leading and trailing edges of the sheet are precisely positioned in parallel with the scanning direction of the recording beam L.

After the registration, the feeding rollers 97 intrude into the transport path so as to nip and vertically transport the sheet upward. When the leading edge of the transported sheet reaches the subscanning rollers 2, which are rotating for subscanning, and is nipped by the subscanning rollers 2, the feeding rollers 97 retract out of the transport path and stop rotating.

Subsequently, the recording operation is started in response to the subscanning of the subscanning rollers 2. When the recording operation is completed, feeding rollers 101, which have been retracted, intrude into the transport path so as to nip the sheet. The recorded sheet is transported to the left in the figure in correlation to the rotation of the feeding rollers 101, sent into the receive magazine 4 through feeding rollers 103 and 107. The trailing edge of the sheet is surely pushed into the receive magazine 4 by the push lever 108.

According to the present embodiment, since the slanted position of the sheet is corrected by utilizing the transport path from the subscanning rollers to the supply magazine, even while the recorded sheet is being fed into the receive magazine after the recording operation, a subsequent sheet can be taken out of the supply magazine and the slant correcting operation can be executed. As a result, when a plurality of sheets are successively recorded, the total cycle time can be shortened to a great extent.

Fourth Embodiment

Figure 16:
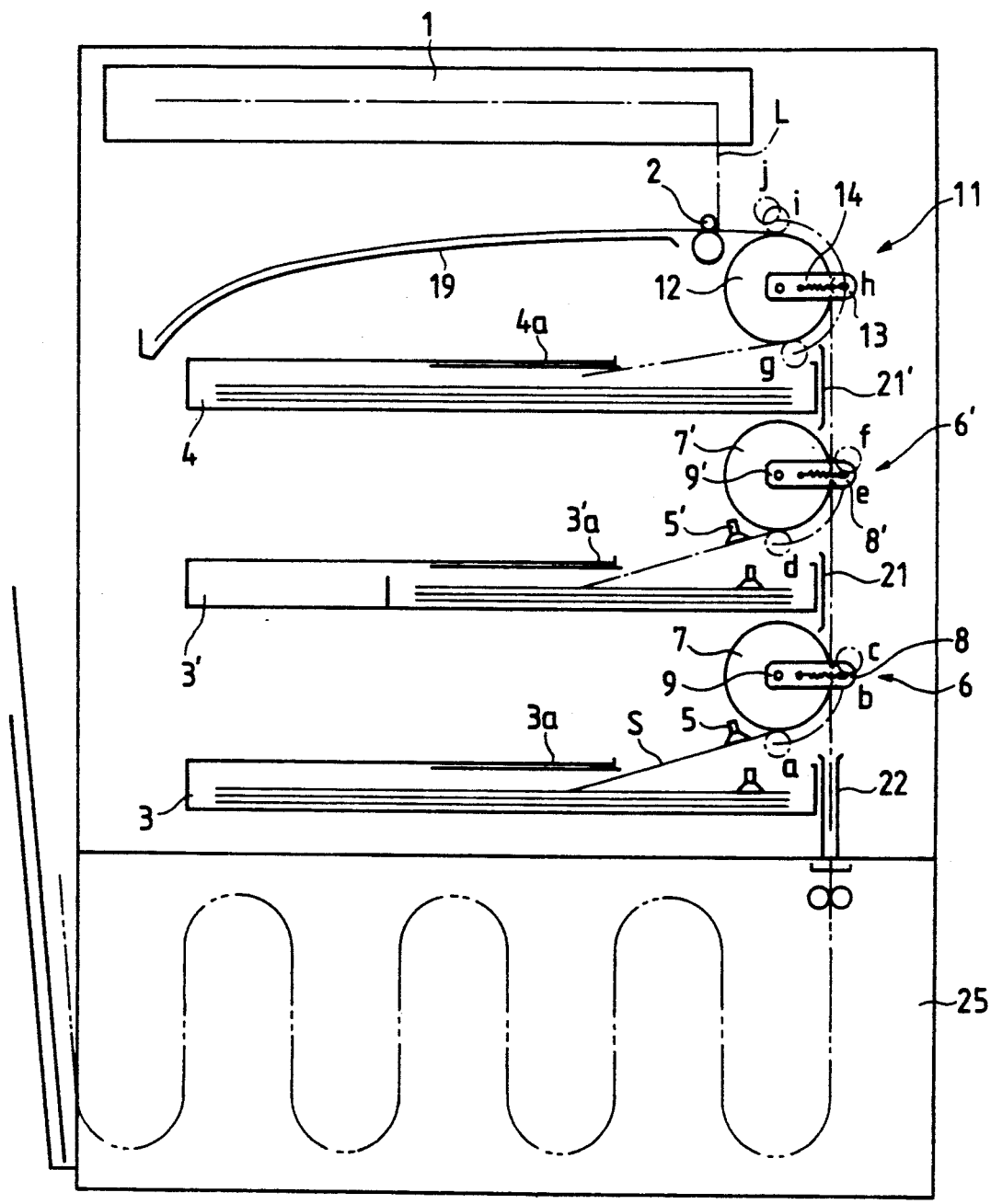
FIG. 16 is a view showing a structure of a fourth embodiment of the present invention.

Next, the embodiment of the apparatus, which is an improvement of the first embodiment and can selectively use sheets of a plurality of sizes, will be described with reference to FIG. 16. The same numerals as shown in FIG. 1 denote the same or equivalent members as or to those in FIG. 1. As shown in FIG. 16, the subscanning rollers 2 are mounted below the laser optical unit 1, and the supply magazine 3 in which non-recorded half-sized sheets S are piled, a supply magazine 3' in which non-recorded quarter sheets S are piled, and the receive magazine 4 in which recorded sheets S are stocked are arranged in a row in this order from the bottom below the subscanning rollers 2. The magazines 3, 3' and 4 are respectively provided with slide covers 3a, 3'a and 4a, which can open and shut for taking in and out the sheet S, at the top planes thereof. In the state in which the slide covers 3a, 3'a and 4 are closed, the insides of the magazines 3, 3' and 4 are shaded from the outside. Furthermore, since the emulsion planes of the sheets piled in the magazines 3, 3' and 4 face downward, the shading efficiency is further enhanced.

Suction devices 5 and 5' are mounted above openings, which are made when the covers 3a and 3'a of the supply magazines 3 and 3', and take out the sheets S stocked in the supply magazines 3 and 3' one by one through the openings.

Mounted above the opening of the supply magazine 3 is the direction turning unit 6 which has the same composition as that mentioned in the above embodiment and controls the transport direction of the sheet. The driven roller 8 planetarily revolves around the driving roller 7 in correlation to the rotation of the lever 9. When the lever 9 turns and the driven roller 8 is moved from the position "a" to the position "c", the driven roller 8 is separated from the periphery of the driving roller 7.

Direction turning units 6' and 11, which have the same structure as that of the direction turning unit 6, are also mounted above the openings of the magazines 3' and 4 and the driving rollers 7' and 12 are driven together with the driving roller 7 through a chain by a single motor. The driven roller 13 of the direction turning unit 11 can revolve in an approximately 180-degree arc around the driving roller 12.

A transport path of the sheet is formed by the guide plates 21, 21' and 19. The guide plates are straight or gently curved, and arranged so that the surface of the sheet S is not damaged by rubbing against the guide plates during being transported. Numeral 22 denotes a guide plate for leading the recorded sheet S into the automatic developer 25.

In this apparatus, the distance between the openings for taking the sheet out of the supply magazines 3 and 3' and the image recording station is almost equal to the length of the sheets S, respectively stocked in the magazines 3 and 3', in the transport direction. In other words, the distance between the opening of the magazine 3 and the subscanning rollers 2 is approximately 430 mm and the distance between the opening of the magazine 3' and the subscanning rollers 2 is approximately 280 mm. Therefore, whichever sheet is used, when the leading edge of the sheet S reaches the subscanning rollers 2, the trailing edge of the sheet S is completely taken out of the magazine 3 or 3'. As a result, it is possible to prevent the transport speed of the sheet S during the subscanning operation from being disrupted and the quality of the image from being lowered by rubbing of the sheet S being recorded against the sheets S in the magazines 3 and 3' or the contact of the trailing edge of the sheet S with the magazines 3 and 3'. Furthermore, the time required for image recording can be minimized for any sized sheet.

Next, operations of this image recording apparatus will be described.

The supply magazines 3 and 3', which contain non-recorded sheets S of different sizes, are mounted at predetermined positions in the main body of the apparatus and the slide covers 3a and 3'a are opened in the state in which the inside of the apparatus is shaded.

When an image is recorded on the half-sized sheet S, the suction devices 5 is operated so as to lift the uppermost sheet of the sheets S piled in the supply magazine 3. Subsequently, the end of the sheet S lifted by the suction device 5 is nipped between the driving roller 7 and the driven roller 8 by turning the lever 9 in an approximately 90-degree arc clockwise and revolving the driven roller 8 from the initial position "b" to the position "a". After the leading edge of the uppermost sheet S is thus lifted, the driving roller 7 is rotated counterclockwise, the lever 9 is simultaneously rotated at the same angular velocity as that of the driving roller 7, and then, the driving roller 7 and the driven roller 8 are rotated with the leading edge of the sheet S nipped therebetween so as to change the advance direction of the sheet S into the upward direction. When the driven roller 8 is returned to the initial position "b", the turn of the lever 9 is stopped and the driving roller 7 is continued to be driven. As a result, the advance direction is fixed to the vertical direction and the sheet S is vertically transported upward through the transport path guided by the guide plate 21. At this time, the driven roller 8' of the direction turning unit 6' is retracted in the position "f".

The leading edge of the sheet S reaches the direction turning unit 11 and is nipped between the driving roller 12, which rotates counterclockwise at the same angular velocity as the driving roller 7, and the driven roller 13, which stands by in the position "h". Then, the lever 14 also turns at the same angular velocity as that of the driving roller 12 so as to change the advance direction of the sheet S. When the driven roller 13 reaches the position "i", the lever 14 is stopped and the advance direction of the leading edge of the sheet S is fixed to the left. By continuing to rotate the driving roller 12, the sheet S is advanced to the left on the transport path. At the time when the leading edge of the sheet S being transported passes between the pair of subscanning rollers 2, which are rotating at a constant speed, and the end edge of the sheet S is completely out of the supply magazine 3, the driving rollers 7, 7' and 12 of the direction turning units 6, 6' and 11 stop the rotations thereof. Subsequently, the driven roller 8 is retracted to the position "a" and releases the sheet S from being nipped so that only the driving force of the subscanning rollers 2 is transmitted to the sheet S. The retraction of the driven roller 8 to the position "a" enables the trailing edge of the sheet S to be released while the distance between the opening for taking the sheet out of the magazine 3 and the image recording portion adjacent to the subscanning rollers 2 is minimized.

When the subscanning rollers 2 thus starts a high-precision subscanning operation, the shutter in the laser optical unit 1 is opened, the main scanning onto the sheet S is started by the laser beam L, and a latent image is recorded on the upper emulsion surface of the sheet S.

After the image recording operation, the subscanning rollers 2 are reversely rotated so as to transport the recorded sheet S in the direction reverse of that during the recording operation. When the trailing edge of the sheet S reaches the driving roller 12 of the direction turning unit 11, the driven roller 13, which has been retracted, is returned to the position "i", grips the trailing end edge of the sheet S, and is revolved at the same angular velocity as that of the driving roller 12, so that the advance direction of the sheet S is changed. The driven roller 13 reaches the position "g", and the drive of the lever 14 is stopped so as to stop the driven roller 13. By continuing to drive the driving roller 12, the recorded sheet S is sent into the receive magazine 4 and the driven roller 13 is returned to the initial position "h".

On the other hand, when the recording is performed on a quarter- sheet, the sheet S is taken out of the magazine 3' by the suction device 5' and the same recording as that onto the half sheet S is executed. The sheet S is vertically transported upward by using the direction turning unit 6' and sent to the subscanning rollers 2 by using the direction turning unit 11, and then, the driven rollers 8' and 13 are retracted to the positions "d" and "j", and the sheet S is transported only by the subscanning rollers 2, so that the image recording is executed.

Even in recording onto such a quarter sheet S, when the leading edge of the sheet S reaches the subscanning rollers 2, the trailing edge of the sheet S is out of the magazine 4 and in a completely free state. Therefore, the recording operation can be performed in the minimum cycle time without lowering the quality of the image.

Furthermore, by changing the advance direction of the recorded sheet S by using the direction turning units 11, 6' and 6, it is possible to feed the recorded sheet S to the automatic developer 25 mounted in the image recording apparatus, instead of sending the recorded sheet S into the receive magazine 4. In this case, the driven roller 13 gripping the end edge of the recorded sheet S is revolved at the same angular velocity as that of the driving roller 12 and stopped at the position "h". The driving roller 12 keeps on rotating, so that the advance direction of the leading edge of the sheet S is changed into the vertical downward direction. At this time, the driven rollers 8' and 8 respectively stand by at the positions "f" and "c". When a detection mechanism, not shown, detects that the leading edge of the sheet S passes between the driving roller 12 and the driven roller 13, the driven roller 8' is moved to the position "e" and the direction turning unit 6' transports the sheet S downward. Similarly, when the leading edge of the sheet S passes between the driving roller 7 and the driven roller 8, the driven roller 8 is moved to the position "b" so as to transport the sheet S downward. Furthermore, when the leading edge of the sheet S is inserted into between the guide plates 22, the shutter of the automatic developer 25 is opened; the sheet S is sent into the automatic developer 25, and ejected onto a tray fixed to the side of the apparatus through the processes, such as developing, fixing, drying and so on.

Fifth Embodiment

Figure 17:
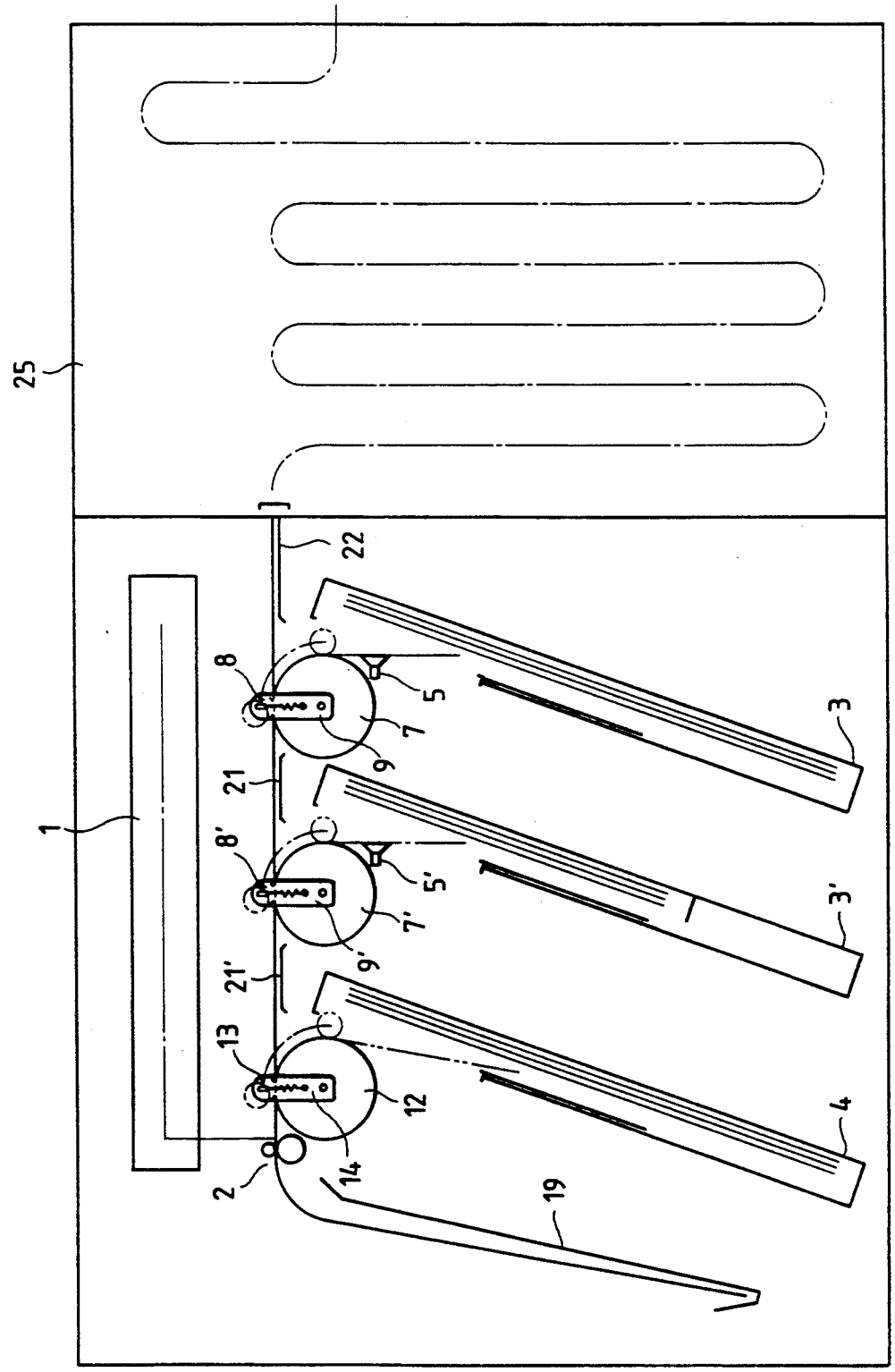
FIG. 17 is a view showing a structure of a fifth embodiment of the present invention.

FIG. 17 shows a structure of an embodiment corresponding to the embodiment shown in FIG. 14. The embodiment can selectively use a plurality of sizes of sheets like the apparatus shown in FIG. 16.

As shown in FIG. 17, the supply magazines 3 and 3' and the receive magazine 4 respectively stand almost vertical in a row. The same numerals as those in FIG. 16 denote the same or equivalent members as or to those in FIG. 14. Since operations are almost the same as above, a detailed description will be omitted.

In the above fourth and fifth embodiments, the image recording apparatus which uses a plurality of sizes of sheets, but it is natural that the apparatus may be provided with more sizes of supply magazines.

Sixth Embodiment

Figure 18:
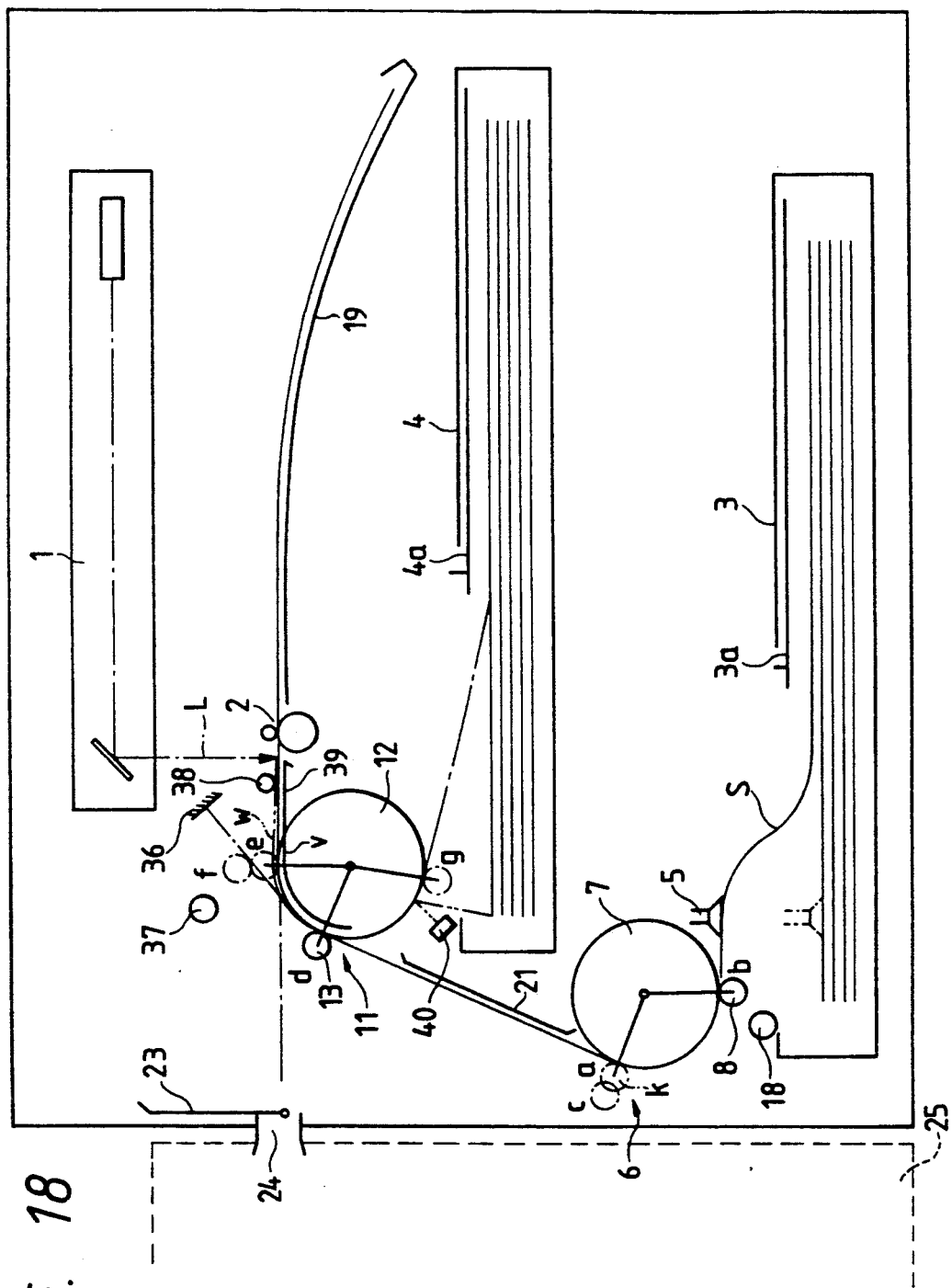
FIG. 18 is a view showing a structure of a sixth embodiment of the present invention.

FIG. 18 shows the sixth embodiment of the present invention. The present invention is characterized in that the registration is executed at the leading portion of the sheet in the advance direction. The same numerals as those shown in the above embodiments denote the same or equivalent members as or to those above.

Below the subscanning rollers 2, the supply magazine 3 and the receive magazine 4 are arranged in a row in this order from below, whose positions are a little different front and rear.

Numeral 39 denotes a movable guide plate whose surface is smoothly treated and has a lower friction resistance than that of the surface of the driving roller 12. The movable guide plate 39 is movable up and down between the positions V and W, and the movement between the positions V and W is synchronized with the movement of the driven roller 13 between the positions "e" and "f". The position V is the position where the movable guide plate 39 is retracted out of the transport path, and the sheet and the driving roller 12 are in contact, so that the sheet can be transported by the drive of the driving roller 12. On the other hand, the position W is the position where the movable guide plate 39 is intruded into the transport path, and the sheet lifted by the movable guide plate 39 is not in contact with the driving roller 12, and the transport resistance is lowered.

Numeral 36 denotes a sheet correcting member for correcting and positioning a slanted sheet and its plane in contact with the leading edge of the sheet is arranged in parallel with the main scanning line of the laser beam. The correcting member 36 is located on the upper right side of the direction turning unit 11. When the driven roller 8 is in the position "a", the length of the transport path between an intersection of the driven roller 8 and the driving roller 7 and the correcting member 36 is set shorter than the length of the sheet in the transport direction. This arrangement enables the apparatus to be compact.

Next, the operation of the above-mentioned image recording apparatus will be described.

The uppermost sheet of the sheets piled in the supply magazine 3 is lifted by the suction device 5, and the leading edge of the sheet is nipped between the driving roller 7 of the direction turning unit 6 and the driven roller 8 which stands by in the position "b". After that, the absorptive force of the suction device 5 is released so as to lose the holding force for the sheet. The driving roller 7 is rotatably driven by a drive source, not shown, and the driven roller 8 simultaneously is revolved clockwise in the figure at the same angular velocity as the driving roller 7 with the leading edge of the sheet nipped so as to change the advance direction of the leading edge of the sheet into the upward direction. When the driven roller 8 reaches the position "a", the driven roller 8 stops its revolutionary movement. Subsequently, by continuing only the rotational drive of the driving- roller 7, the driven roller 8 is rotated following the driving roller 7 so as to advance the sheet upward along the guide plate 21. When the leading edge of the sheet is inserted between the driving roller 12 of the direction turning unit 11 and the driven roller 13 which stands by in the position "d", the driven roller 13, with the sheet nipped, revolves to the position "e" at the same peripheral velocity as the sheet transport speed along the periphery of the driving roller 12 and once changes the advance direction of the sheet into the right. Then, the driven roller 13 is retracted from the position "e" to the position "f", and the leading edge of the sheet, which is curved by being held by the driven roller 13, is directed toward the correcting member 36 by the restitution thereof. When the sheet is transported upward by the drive of the driving roller 7 in this state, the leading edge of the sheet abuts against the correcting member 36, is corrected not to be slanted and precisely positioned to be in parallel with the main scanning direction. If the sheet is slanted when transported, when the whole leading edge of the sheet abuts against the correcting member 36, the sheet is twisted. However, the twist is absorbed into an infirm portion of the sheet.

After the correcting operation is thus performed, when the driven roller 13, which has been retracted in the position "f", is returned to the position "e", the leading edge of the sheet is directed toward the subscanning rollers 2 and nipped between the driving roller 12 and the driven roller 13. Then, when the driving,. roller 8 is moved from the position "a" to the position "c", the trailing edge of the sheet is released and the sheet is untwisted.

Subsequently, the driving roller 12 is normally rotated, the sheet is advanced along the guide plate 39 toward the subscanning rollers 2. The sheet is transported until the trailing edge thereof is separated from a guide roller 38 and completely taken out of the supply magazine 3. When the trailing edge of the sheet is separated from the guide roller 38 and taken out of the supply magazine 3, if the leading edge of the sheet is being transported beyond the subscanning rollers 2, the driving roller 12 of the direction turning unit 11 is rotated in the direction reverse of that up to this (counterclockwise in the figure).

When the leading edge of the sheet reaches the laser recording position, the driving roller 12 and the subscanning rollers 2 are rotated in a normal direction at the same transport speed so as to transport the sheet forward. The leading edge of the sheet reaches the subscanning rollers 2, which are rotating in a normal direction, and is nipped between the subscanning rollers 2, the driven roller 13 is simultaneously separated from the driving roller 12 and retracted to the position "f", and the rotation of the driving roller 12 is stopped. At the same time, the movable guide plate 39, which has been retracted in the position V, is lifted upward, moved to the position W, separates the sheet from the surface of the driving roller 12, and functions as a transport guide during the subscanning operation. The material of the movable guide plate 39 to be used is unlikely to cause static electricity and the surface thereof is smoothly treated, or embossed as shown in FIGS. 12 and 13 so that the coefficient of friction is extremely low.

Figure 20:
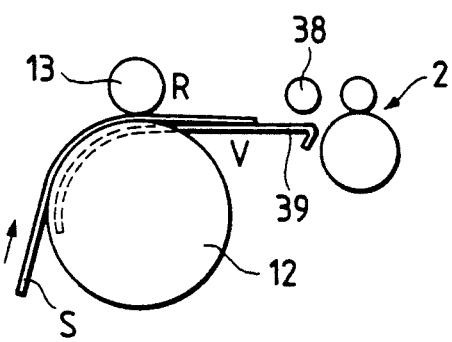
FIGS. 20 to 23 are views explaining operations of the sixth embodiment.
Figure 21:
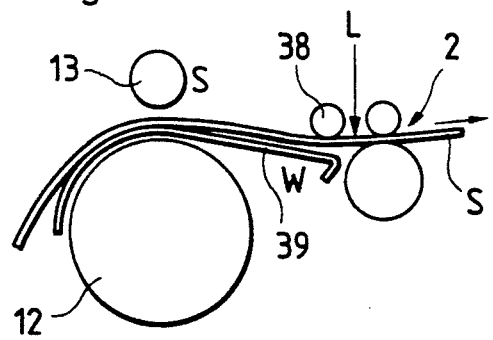

Referring to FIGS. 20 and 21, operations of the movable guide plate 39 and peripherals thereof will be described in more detail. FIG. 20 shows the state in which the driven roller 13 is in the position "e", the movable guide plate 39 is lowered to the position V, and the sheet S nipped between the driving roller 12 and the driven roller 13 is being transported toward the subscanning rollers 2. In this state, the path between the nipping position of the driving roller 12 and the driven roller 13, and the subscanning rollers 2, is almost straight. As a result, a stable sheet transport can be performed.

On the other hand, FIG. 21 shows the state in which the sheet S reaches the subscanning rollers 2 and the recording operation is being executed by the laser beam L. In this state, as mentioned above, the driven roller 13 is separated from the sheet S, the movable guide plate 39 is in the position W, that is, in the transport path and lifting the sheet from the driving roller 12, and the driving roller 12 and the sheet S are not in contact.

Such arrangement brings about the following effects: First, since the sheet S being recorded is in contact with only the subscanning rollers 2 and the guide plates 19 and 39, and is not in contact with the driving roller 12, it is unnecessary to drive the driving roller 12 and so on in synchronization with the subscanning rollers 2 during the subscanning operation and therefore the subscanning operation is more stable.

Furthermore, since the contact point of the guide roller 38 and the sheet S is lower than the line which links the contact point of the movable guide plate 39 and the sheet S, and the contact point of the subscanning rollers 2, the sheet S is almost S-shaped due to the balance between its own weight and elasticity in this portion as shown in FIG. 21. Therefore, the sheet S is always pressed against the guide roller 38 and always stable without swinging at the recording position in spite of such a simple structure.

In addition, since only the subscanning rollers 2 are required to be driven during the recording operation, it is possible to make the gears, chains, pulse motors and so on, which are used in the transport mechanism and cause a harmful oscillation to the subscanning operation, idle. Furthermore, though the surface of the driving roller 12, which has a transport drive force, is provided with a rubber layer and so on in order to enhance the coefficient of friction of the surface, since the driving roller 12 is not in contact with the sheet S while in an idle state during the recording operation, this does not cause an increase of the friction force or a change, which are undesirable for the subscanning operation. Further, the rollers on the driving side are not required to be retractable in and out of the transport path, and therefore, the mechanism can be simple.

Figure 22:
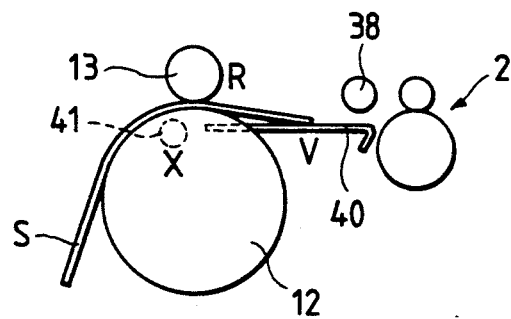
Figure 23:
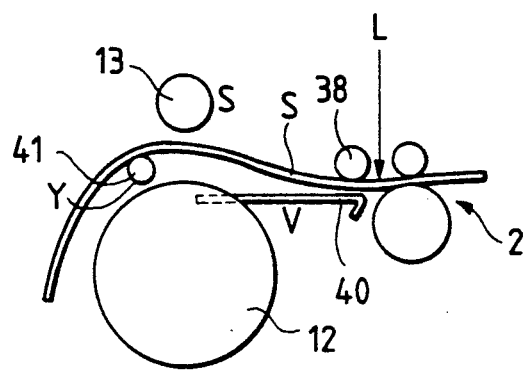
Figure 24:
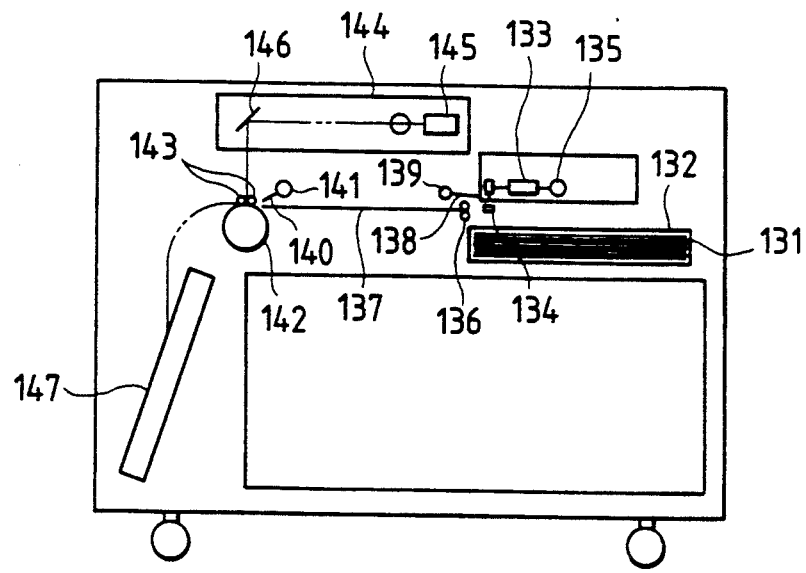
FIG. 24 is a view showing a structure of a prior art.
Figure 25:
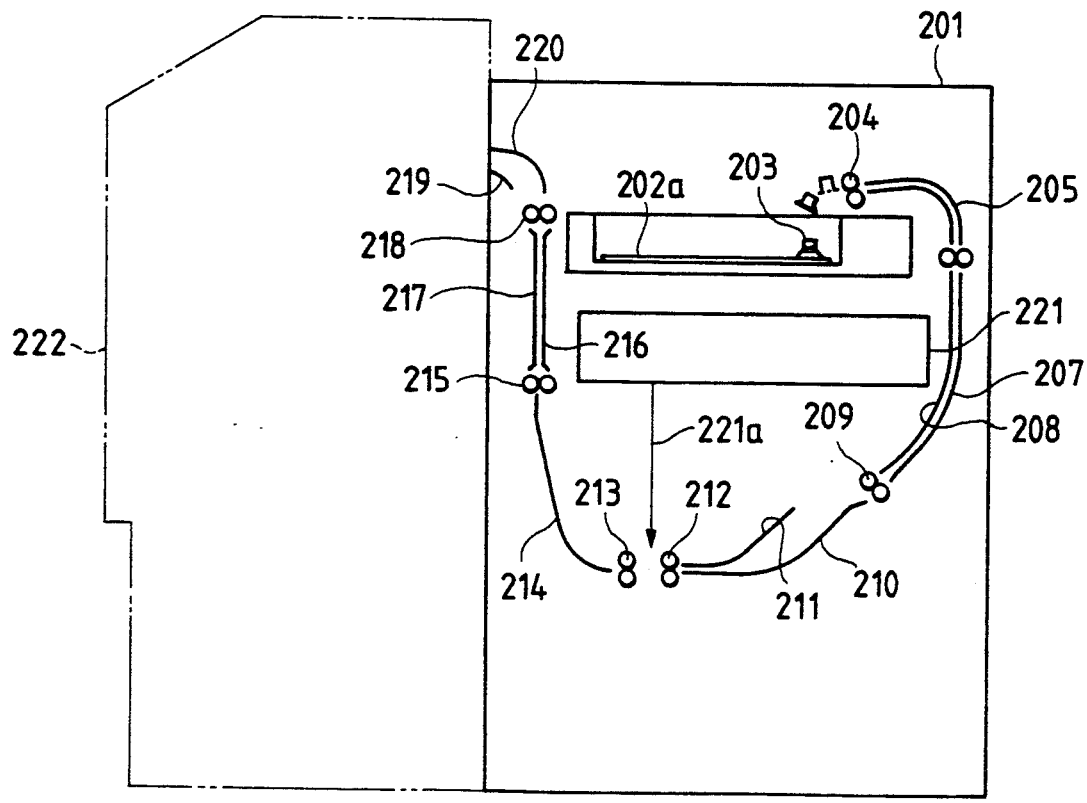
FIG. 25 is a view showing a structure of another prior art.

FIGS. 22 and 23 show a variation of the present embodiment in which a roller 41, which is retractable in and out of the transport path and which has no driving force, and a fixed guide plate 40 are mounted instead of the guide plate 39 shown in FIGS. 20 and 21. The roller 41 may be supported to be rotatable when it comes into contact with the sheet or may not be rotatable if the portion in contact with the sheet S is smoothly treated. According to this arrangement, the same effects as above can be obtained only by mounting the mechanism for retracting a small member, the roller 41, from the position X to Y.

Figure 19:
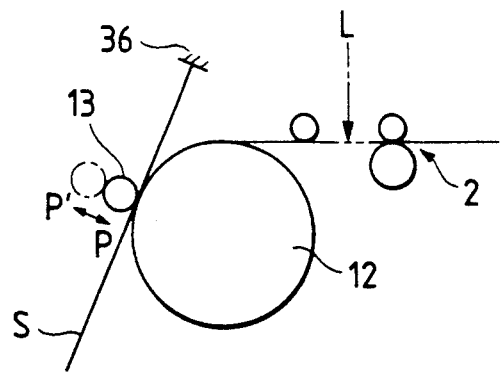
FIG. 19 is a view showing a variation of the sixth embodiment.

In the above embodiment, before the sheet correcting operation, the driven roller 13, which nips the sheet together with the driving roller 12 is moved from the position P to R through Q and sets the leading edge of the sheet free. However, as shown in FIG. 19, the sheet correcting operation may be executed by continuing to transport the sheet with the driven roller 13 fixed in the position P and making the sheet abut against the correcting member 36 which is positioned ahead on the tangent between the sheet and the driven roller. In this case, the driven roller 13 is separated from the position P and moved to the position P'(FIG. 19). Subsequently, the slanted sheet is corrected by lifting the sheet from behind in the same manner as the above embodiment. After the correcting operation, the driven roller 13 is again pressed against the driving roller 12 so as to nip the sheet and the next recording process is conducted.

As described above, according to the present invention, since the sheet correcting operation is executed at the end position of the sheet in the advance direction, any size sheet can be used if the sheet is longer than the distance between the correcting member and the pair of rollers for making the sheet abut against the correcting member.

In all the embodiments described above, the supply magazine and the receive magazine, which occupy a large percentage of the volume of the apparatus, are arranged in a row, and the transport path is mounted to almost surround the periphery of the magazines, and therefore, the apparatus can be made extremely compact. For example, in the embodiment shown in FIG. 1, the length of the sheet in the transport direction is L and the width of the apparatus is approximately 1.5 L. If the half-sized (43 cm $\times$ 35 cm) sheet is used, the width of the apparatus is approximately 65 cm and the apparatus can be made even smaller to almost half of the size of the conventional apparatus shown in FIG. 11.

Furthermore, since the apparatus can be compact, it is possible to mount the apparatus on top of a desk. In this case, the magazines are arranged at the lower part of the apparatus, and therefore, the magazines can be easily loaded.

Still furthermore, since the transport path for recording is mounted at the upper part of the apparatus, when a maintenance operation due to jamming or the like is performed by opening and shutting the apparatus, the top cover of the apparatus is opened and the maintenance operation for the recording portion can be executed from above. This greatly enhances operational efficiency compared with the conventional maintenance operation conducted from the side of the apparatus.

Still furthermore, since during the recording operation the sheet is almost hanging down naturally due to its own weight, excessive force is not applied to the sheet during the recording operation, and an extremely stable subscanning can be realized. In other words, an extremely precise image quality can be obtained.

In addition, in the process of feeding the recording sheet from the stock case for stocking non-recorded sheets to the recording position, after the recording sheet is taken out of the stock case, the recording sheet is once transported in the reverse direction and moved to the second transport path, which has a low transport resistance and surrounds the stock case, and the subscanning operation is performed by subscanning the recording sheet with the use of the second transport path. As a result, a high-precision subscanning operation is possible and the apparatus can be made compact.

What is claimed is:

1. An image recording apparatus, comprising:
   non-used sheet stock means for stocking a stack of non-used recording sheets;
   feeding means for taking a recording sheet out of said non-used sheet stock means and feeding the recording sheet to a recording position, the recording sheet being transported at a constant speed while at the recording position;
   recording means for recording an image on the recording sheet at said recording position; and
   recorded sheet stock means for stocking recorded recording sheets,
   wherein said non-used sheet stock means and said recorded sheet stock means are arranged substantially in parallel, said recording position is disposed above said non-used sheet stock means and said recorded sheet stock means, a transport path for the recording sheet being recorded is arranged so as to almost surround at least one of said stock means, and the recording sheet is not in contact with a stack of sheets stocked in said non-used sheet stock means or a stack of sheets stocked in said recorded sheet stock means during a recording operation.

2. An image recording apparatus as claimed in claim 1, wherein said recording means comprises
a laser source; and
a scanning optical system for scanning a light beam from said laser source in a main scanning direction and applying said light beam to said recording position.

3. An image recording apparatus as claimed in claim 2, said recording means further comprising:
modulation means for modulating said light beam applied to said recording position in accordance with a recording signal.

4. An image recording apparatus as claimed in claim 2, wherein the recording sheet is a photoconductive film.

5. An image recording apparatus as claimed in claim 1, wherein a correcting member for registration of the recording sheet is disposed in said transport path and registration is performed by making the recording sheet transported along said transport path abut against said correcting member.

6. An image recording apparatus as claimed in claim 1, wherein the recording sheet, which is recorded in said recording position, is fed out in a substantially horizontal direction and is advanced along a guide plate which is curved in a direction in which gravity acts.

7. An image recording apparatus as claimed in claim 6, wherein the surface of said guide plate is treated so that coefficient of friction between said surface and said recording sheet is low.

8. An image recording apparatus as claimed in claim 1, wherein the recorded sheet is transported in the direction reverse of the direction during the recording operation and sent into said recorded sheet stock means after the recording operation is completed.

9. An image recording apparatus as claimed in claim 1, further comprising:
automatic developing means for automatically developing the recorded sheet; and
course selecting means for selectively sending the recorded sheet, which is recorded in said recording position, into either said recorded sheet stock means or said automatic developing means.

10. An image recording apparatus as claimed in claim 1, further comprising:
subscanning means, provided with a subscanning roller disposed near said recording position, for transporting the recording sheet to a subscanning direction at a constant speed during the recording operation.

11. An image recording apparatus as claimed in claim 10, further comprising:
a feeding roller, included in said feeding means, for transporting the recording sheet toward said subscanning roller; and
a movable guide plate for retracting out of said transport path when said feeding roller transports the recording sheet to said subscanning roller and intruding into said transport path and lifting the recording sheet so that the recording sheet is not in contact with said feeding roller when said subscanning roller performs a subscanning operation, said movable guide plate having a lower coefficient of friction than that of said feeding roller.

12. An image recording apparatus as claimed in claim 1, wherein a plurality of said non-used sheet stock means are disposed corresponding to a plurality of sizes of the recording sheets and respectively contain sheets of different sizes.

13. An image recording apparatus, comprising:
sheet stock means for stocking a stack of recording sheets;
feeding means for taking a recording sheet out of said sheet stock means and feeding the recording sheet to a recording position;
recording means for recording an image on the recording sheet in said recording position;
a first transport path including a path from said sheet stock means to said recording position;
a second transport path for partially using a common path with said first transport path and including a path which almost surrounds said sheet stock means, said second transport path having a lower transport resistance than that of said first transport path; and
control means for reversely transporting the recording sheet and moving the recording sheet into said second transport path when the trailing edge of the recording sheet taken out of said sheet stock means along said first transport path reaches said common path of said first and second paths, and recording an image on the recording sheet in said recording position while moving the recording sheet along said second transport path.

14. An image recording apparatus as claimed in claim 13, wherein said first transport path is positioned so that the trailing edge of the recording sheet is in contact with said sheet stock means or the stack of sheets in said sheet stock means when the leading edge of the recording sheet taken out of said sheet stock means along said first transport path reaches said recording position, and the trailing edge is not in contact with said sheet stock means or the stack of sheets during the recording operation.

15. An image recording apparatus as claimed in claim 13, wherein a correcting member for registration of the recording sheet is disposed in said second transport path and the recording sheet is registered by making the recording sheet transported in the reverse direction along said second transport path abut against said correcting member.

16. An image recording apparatus as claimed in claim 13, wherein the recording sheet, which is recorded in said recording position, is fed out in a substantially horizontal direction and is advanced along a guide plate which is curved in a direction in which gravity acts.

17. An image recording apparatus as claimed in claim 16, wherein the surface of said guide plate is treated so that coefficient of friction between said surface and the recording sheet is low.

18. An image recording apparatus as claimed in claim 13, further comprising recorded sheet stock means for stocking recorded recording sheets wherein the recorded sheet is transported in a direction reverse of the direction during a recording operation and sent into said recorded sheet stock means after the recording operation is completed.

19. An image recording apparatus as claimed in claim 13, further comprising:
recorded sheet stock means for stocking recorded recording sheets;
automatic developing means for automatically developing the recorded recording sheet; and
course selecting means for selectively sending the recording sheet, which is recorded in said recording position, into either said recorded sheet stock means or said automatic developing means.

20. An image recording apparatus as claimed in claim 13, further comprising:
   subscanning means, provided with a subscanning roller disposed near said recording position, for transporting the recording sheet in a subscanning direction at a constant speed during the recording operation.

21. An image recording apparatus claimed in claim 20, further comprising:
   a feeding roller, included in said feeding means, for transporting the recording sheet toward said subscanning roller; and
   a movable guide plate retractable out of the transport path when said feeding roller transports the recording sheet to said subscanning roller and introduceable into the transport path and lifting the recording sheet so that the recording sheet is not in contact with said feeding roller when said subscanning roller performs a subscanning operation, said movable guide plate having a lower coefficient of friction than that of said feeding roller.

22. An image recording apparatus as claimed in claim 13, wherein a plurality of said sheet stock means are disposed corresponding to a plurality of sheet sizes and respectively contain sheets of different sizes.

23. A sheet supply apparatus, comprising:
   stock means for stocking a stack of sheets;
   takeout means for taking a sheet out of said stock means in a feeding direction;
   reverse transport means for returning a sheet taken out of aid stock means in a direction reverse of the feeding direction;
   correcting means, fixed in a predetermined position in the direction reverse of the feeding direction, for performing registration by arranging the end of the sheet in the reverse direction; and
   feeding means for feeding the sheet to a recording position or a reading position after the registration is performed by said correcting means.

24. A sheet supply apparatus as claimed in claim 23, further comprising means for recording or reading by scanning said recording position or said reading position with a light beam.

* * * * *

UNITED STATES PATENT AND TRADEMARK OFFICE
CERTIFICATE OF CORRECTION

PATENT NO. : 5,151,713            Page 1 of 2

DATED : September 29, 1992

INVENTOR(S) : KEIICHI KAWASAKI, ET AL.

It is certified that error appears in the above-identified patent and that said Letters Patent is hereby corrected as shown below:

ON THE TITLE PAGE

[56] REFERENCES CITED

U.S. PATENT DOCUMENTS
      "Pinkney" should read --Pinckney et al.--.

[73] ASSIGNEE
      "Cannon" should read --Canon--.

COLUMN 1
  Line 19, "are" should read --are sucked--.

COLUMN 5
  Line 6, "spring 10;" should read --spring 10.--.

COLUMN 9
  Line 54, "state" should be deleted.
  Line 62, "driving-" should read --driving--.

COLUMN 11
  Line 67, "4" should read --4a--.

UNITED STATES PATENT AND TRADEMARK OFFICE
CERTIFICATE OF CORRECTION

PATENT NO. : 5,151,713
DATED : September 29, 1992
INVENTOR(S) : KEIICHI KAWASAKI, ET AL.

It is certified that error appears in the above-identified patent and that said Letters Patent is hereby corrected as shown below:

<u>COLUMN 12</u>
   Line 5, "when" should read --in--.

<u>COLUMN 14</u>
   Line 55, "which" should be deleted.

<u>COLUMN 15</u>
   Line 48, "driving-" should read --driving--.

<u>COLUMN 16</u>
   Line 9, "driving,." should read --driving--.
   Line 22, "unit IT" should read --unit 11--.

<u>COLUMN 21</u>
   Line 18, "and" should read --for--.

<u>COLUMN 22</u>
   Line 10, "aid" should read --said--.

Signed and Sealed this

Tenth Day of August, 1993

Attest:

MICHAEL K. KIRK

Attesting Officer     Acting Commissioner of Patents and Trademarks